(12) United States Patent
Price

(10) Patent No.: US 11,679,626 B2
(45) Date of Patent: Jun. 20, 2023

(54) APEX AXLE TRUSS SYSTEM

(71) Applicant: Artec Industries, LLC, North Salt Lake City, UT (US)

(72) Inventor: Nathan C. Price, Clearfield, UT (US)

(73) Assignee: Artec Industries, LLC, North Salt Lake City, UT (US)

( * ) Notice: Subject to any disclaimer, the term of this patent is extended or adjusted under 35 U.S.C. 154(b) by 252 days.

(21) Appl. No.: 16/849,737

(22) Filed: Apr. 15, 2020

(65) Prior Publication Data

US 2020/0331295 A1 Oct. 22, 2020

Related U.S. Application Data

(60) Provisional application No. 62/835,355, filed on Apr. 17, 2019.

(51) Int. Cl.
*B60B 35/16* (2006.01)

(52) U.S. Cl.
CPC ...... *B60B 35/163* (2013.01); *B60B 2310/302* (2013.01); *B60B 2900/212* (2013.01)

(58) Field of Classification Search
CPC ............ B60B 35/163; B60B 2310/302; B60B 2900/212; B60B 35/166
See application file for complete search history.

(56) References Cited

U.S. PATENT DOCUMENTS

| | | | | |
|---|---|---|---|---|
| RE20,590 E | * | 12/1937 | Stow ...................... | B61D 11/00 105/364 |
| 2,123,456 A | * | 7/1938 | Tuft ....................... | B62D 63/08 29/446 |
| 2,240,670 A | * | 5/1941 | Sanford ................. | B61D 11/00 105/418 |
| RE21,862 E | * | 7/1941 | Sanford ................. | B61D 7/30 105/418 |
| 3,171,642 A | * | 3/1965 | Allison .................... | B60G 9/00 267/67 |
| 3,249,169 A | * | 5/1966 | Cheak ................... | B62D 13/00 280/789 |

(Continued)

OTHER PUBLICATIONS https://www.artecindustries.com/lowerftruss-sd, retrieved Apr. 15, 2020.

(Continued)

*Primary Examiner* — Paul N Dickson
*Assistant Examiner* — Timothy Wilhelm
(74) *Attorney, Agent, or Firm* — Lowenstein Sandler LLP

(57) ABSTRACT

An apex axle truss system includes a first apex axle truss including a sheet of metal that has been bent to form a first substantially vertical wall, second substantially vertical wall, first angled wall, and second angled wall. The first substantially vertical wall is configured to be secured to a first lateral side of an axle housing. The second substantially vertical wall is configured to be secured to a second lateral side of the axle housing. The first angled wall is disposed between the first substantially vertical wall and the second substantially vertical wall. The second angled wall is disposed between the first angled wall and the second substantially vertical wall. The first angled wall and the second angled wall form an apex that is configured to be disposed over an upper surface of the axle housing.

19 Claims, 16 Drawing Sheets

(56) References Cited

U.S. PATENT DOCUMENTS

| | | | | |
|---|---|---|---|---|
| 4,040,643 A * | 8/1977 | Applequist | B60B 35/109 | 180/906 |
| 4,045,052 A * | 8/1977 | Wilfert | B60G 99/002 | 267/251 |
| 4,271,922 A * | 6/1981 | Kishline | B60G 3/24 | 180/358 |
| 4,334,696 A * | 6/1982 | Bergstrom | B60G 9/00 | 280/124.108 |
| 4,664,446 A * | 5/1987 | Word | B60P 1/56 | 298/8 T |
| 4,760,755 A * | 8/1988 | Peck | B60B 35/16 | 74/606 R |
| 4,768,808 A * | 9/1988 | DeRees | B60G 9/00 | 180/905 |
| 5,915,728 A * | 6/1999 | Blackburn | B60G 9/00 | 280/847 |
| 6,129,367 A * | 10/2000 | Bublies | B60G 21/051 | 280/124.107 |
| 6,209,896 B1 * | 4/2001 | Hickling | B60G 9/00 | 280/124.169 |
| 6,994,405 B2 * | 2/2006 | Li | B60B 35/003 | 301/124.1 |
| 7,134,830 B2 * | 11/2006 | Wood | B60P 1/42 | 414/526 |
| 7,325,821 B2 * | 2/2008 | Myers | B60B 35/007 | 301/124.1 |
| 7,500,688 B2 * | 3/2009 | Mullican | B60G 11/465 | 280/124.17 |
| 7,823,429 B2 * | 11/2010 | Drewes | B21D 53/88 | 72/58 |
| 8,109,000 B2 * | 2/2012 | Zalanca | B60B 35/16 | 29/897 |
| 8,205,899 B2 * | 6/2012 | Mackin | A01D 41/12 | 180/209 |
| 8,528,923 B2 * | 9/2013 | Wakefield | F16D 51/14 | 280/124.11 |
| 8,540,262 B2 * | 9/2013 | Reiter | B60B 35/163 | 280/124.156 |
| 9,150,049 B2 * | 10/2015 | Albergante | F16D 51/00 | |
| 9,193,236 B2 * | 11/2015 | Westnedge | B23P 11/00 | |
| 9,238,386 B2 * | 1/2016 | Dockstader | B60B 35/163 | |
| 9,290,072 B2 * | 3/2016 | Berner | B60B 35/00 | |
| 9,315,083 B2 * | 4/2016 | Noble | B60G 9/02 | |
| 9,327,571 B2 * | 5/2016 | Pierce | B60B 35/007 | |
| 9,919,559 B2 * | 3/2018 | Szczepanski | B60B 35/166 | |
| 9,956,839 B2 * | 5/2018 | Jensen | B60G 9/003 | |
| 10,220,663 B2 * | 3/2019 | Frey | B60G 11/26 | |
| 11,046,140 B2 * | 6/2021 | Cho | B60G 21/055 | |
| 11,130,379 B2 * | 9/2021 | Miller | B60G 7/008 | |
| 11,198,326 B2 * | 12/2021 | Khoury | B60B 35/04 | |
| 11,214,110 B2 * | 1/2022 | Sollenlid | B60P 1/04 | |
| 2007/0145816 A1 * | 6/2007 | Gile | B60K 17/16 | 301/132 |
| 2013/0333959 A1 * | 12/2013 | Wagemann | B60K 17/306 | 180/62 |
| 2020/0406960 A1 * | 12/2020 | Anetzberger | F16H 25/20 | |

OTHER PUBLICATIONS https://www.artecindustries.com/rtruss-aam925, retrieved Apr. 15, 2020.

https://www.artecindustries.com/backbone-14b, retrieved Apr. 15, 2020.

https://www.artecindustries.com/ftruss-14b, retrieved Apr. 15, 2020.

* cited by examiner

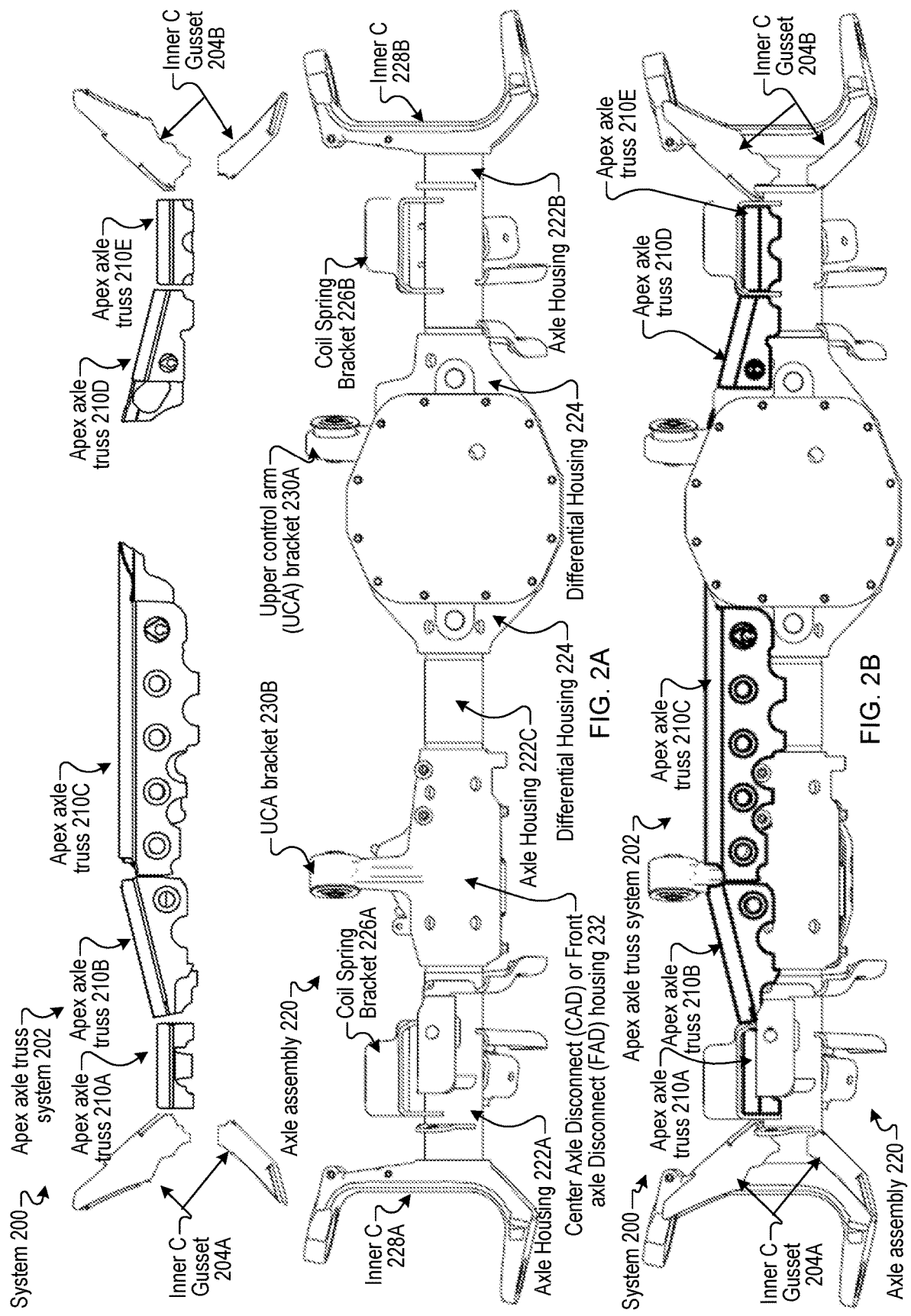

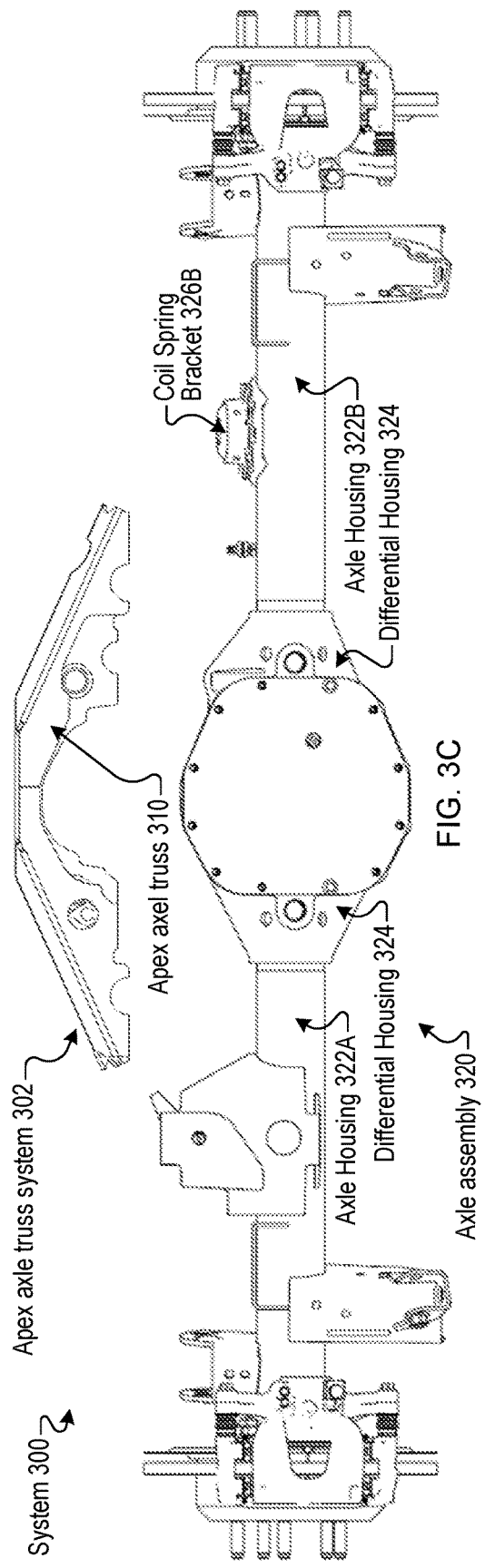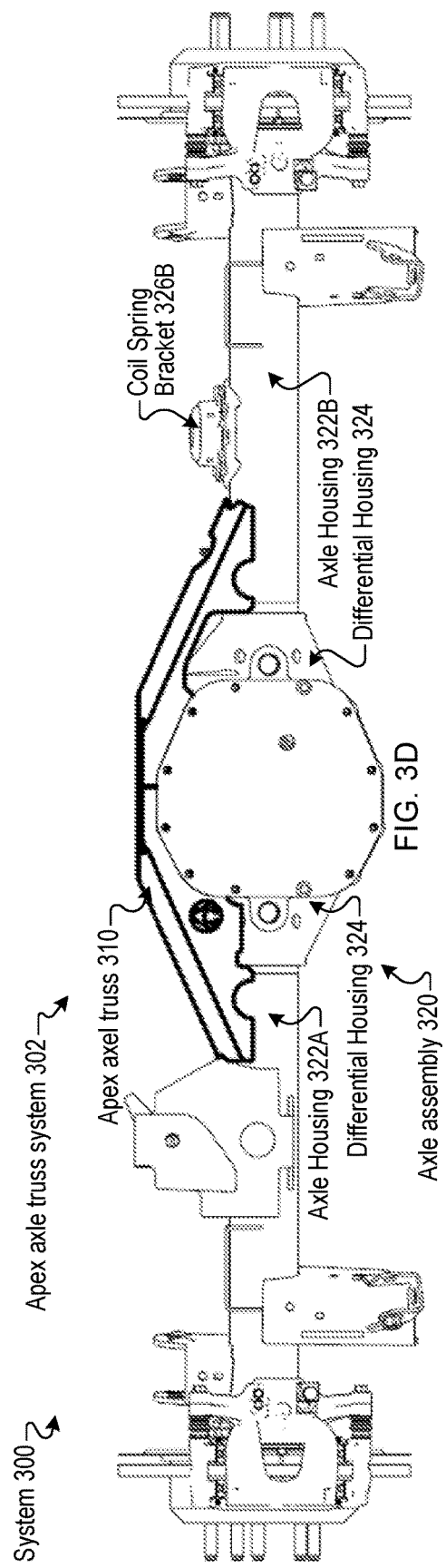

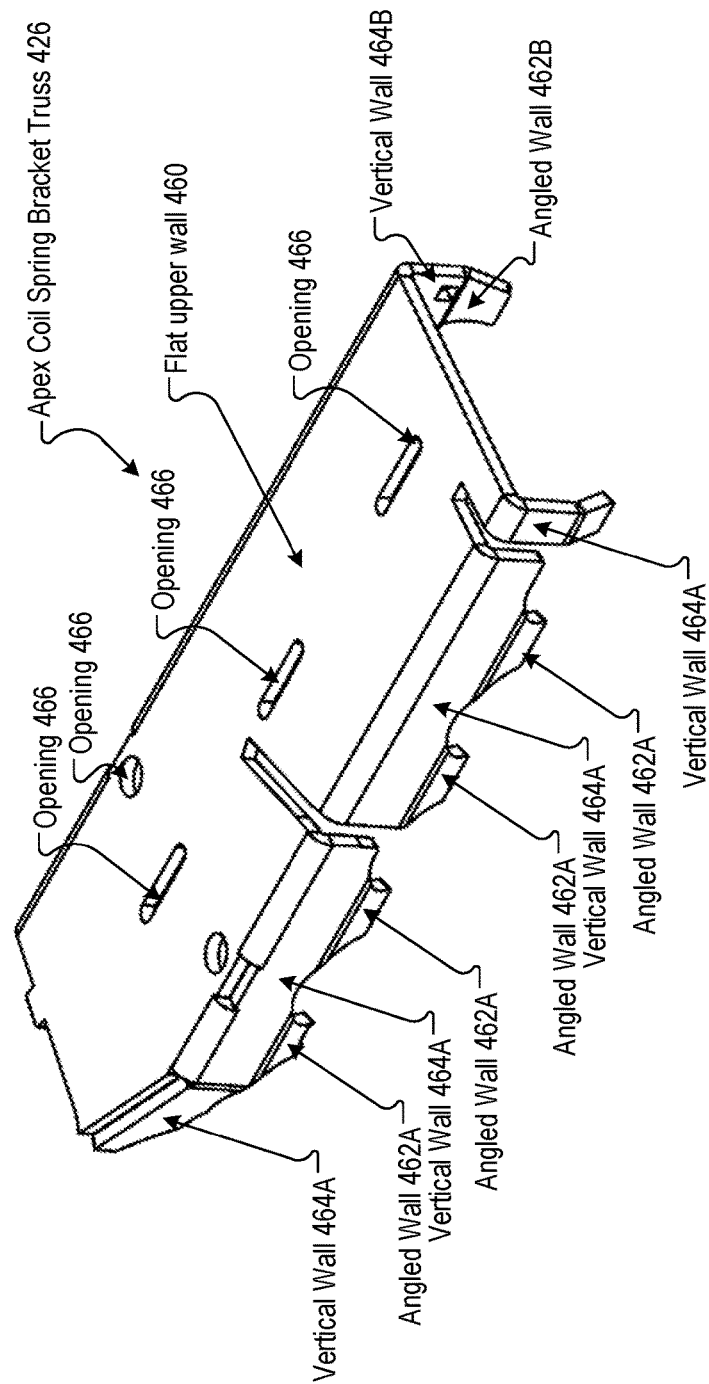
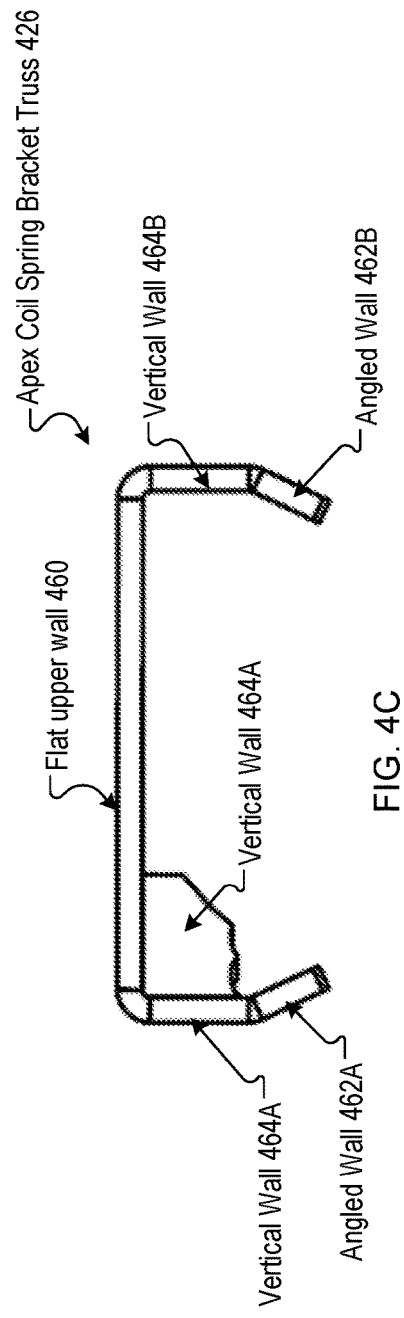
FIG. 4B
FIG. 4C

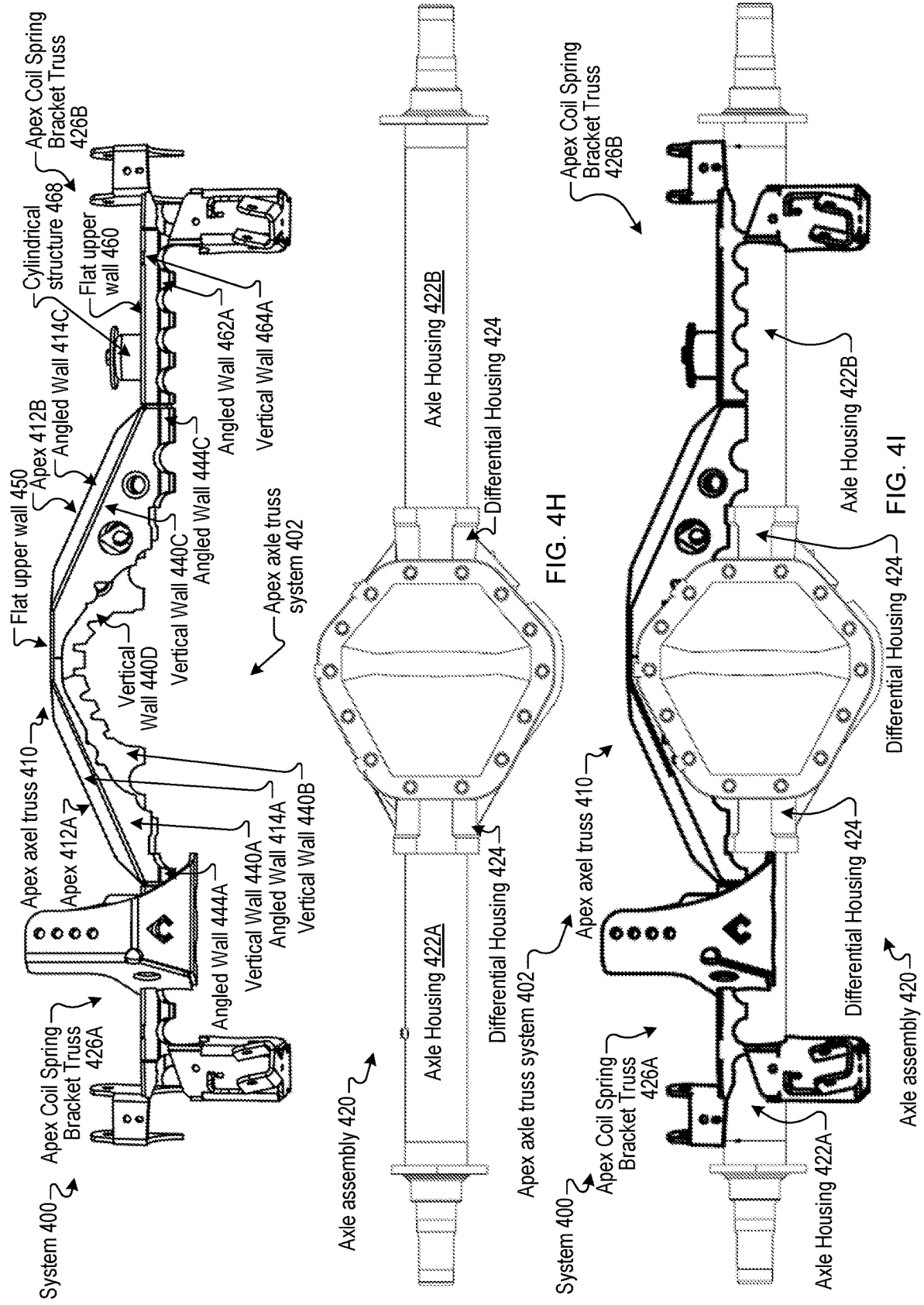

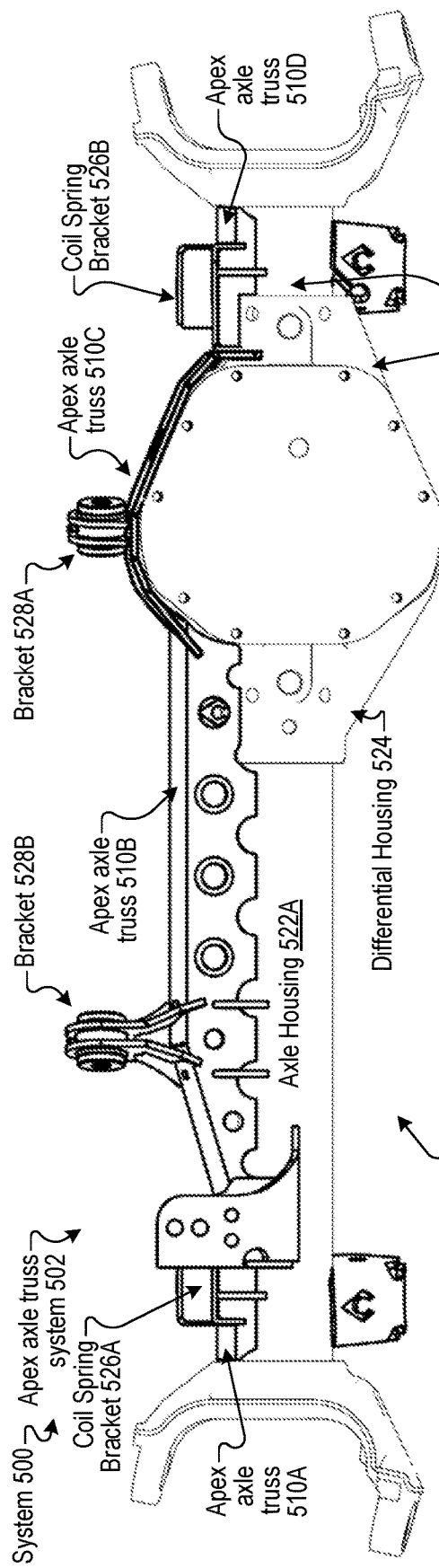
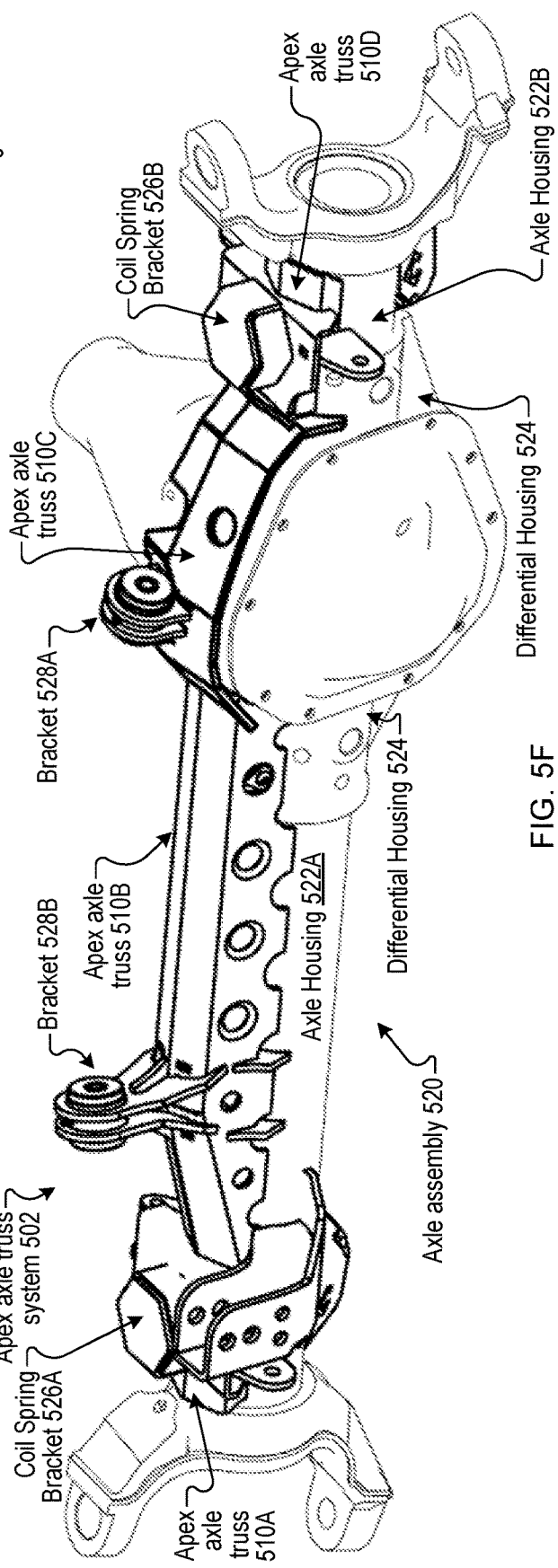
FIG. 5E
FIG. 5F

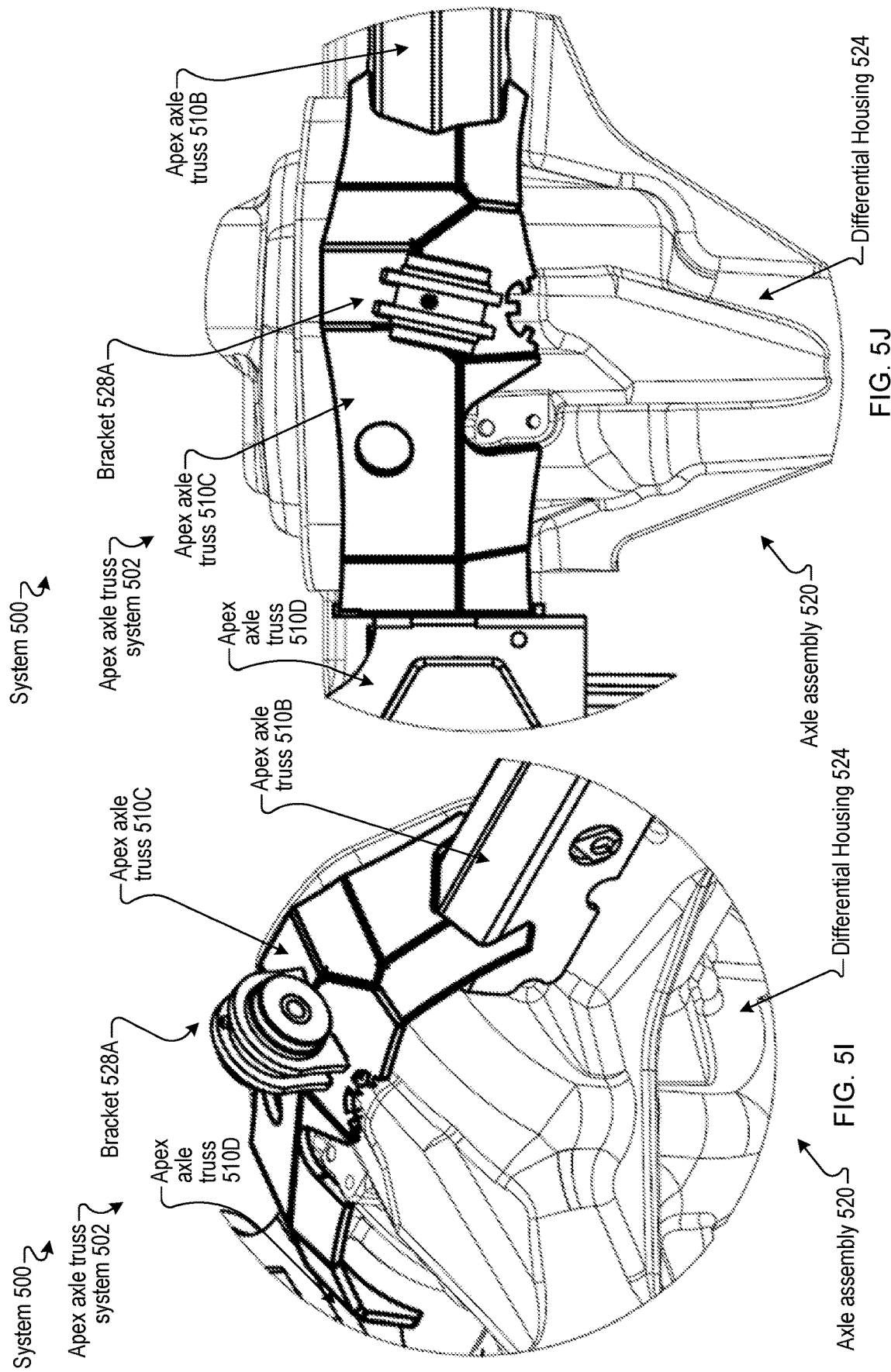

US 11,679,626 B2

APEX AXLE TRUSS SYSTEM

RELATED APPLICATION

This application claims benefit of U.S. Provisional Patent Application 62/835,355, filed Apr. 17, 2019, the entire content of which is incorporated by reference herein.

BACKGROUND

Axle assemblies of vehicles (e.g., automobiles) are designed for standard stresses, such as driving on payment, standard acceleration, etc. Axle assemblies may become damaged due to increased stresses on the axle housing. For example, an axle assembly may be damaged due to driving on uneven surfaces (e.g., dirt roads, washboard, rocks, potholes, etc.), performing a jump, hitting a curb, being in an accident, sudden acceleration, etc. A damaged axle assembly may bend or break. A damaged axle assembly can cause the vehicle not to function and/or may cause damage to other components of the vehicle.

BRIEF DESCRIPTION OF DRAWINGS

The examples described herein will be understood more fully from the detailed description given below and from the accompanying drawings, which, however, should not be taken to limit the application to the specific examples, but are for explanation and understanding only.

FIGS. 2A-D illustrate a system including an apex axle truss system and an axle assembly, according to certain embodiments.

FIGS. 3A-D illustrates an apex axle truss of an apex axle truss system, according to certain embodiments.

FIGS. 4A-J illustrates an apex axle truss system, according to certain embodiments.

FIGS. 5A-J illustrates an apex axle truss system, according to certain embodiments.

DETAILED DESCRIPTION

Figure 1B:
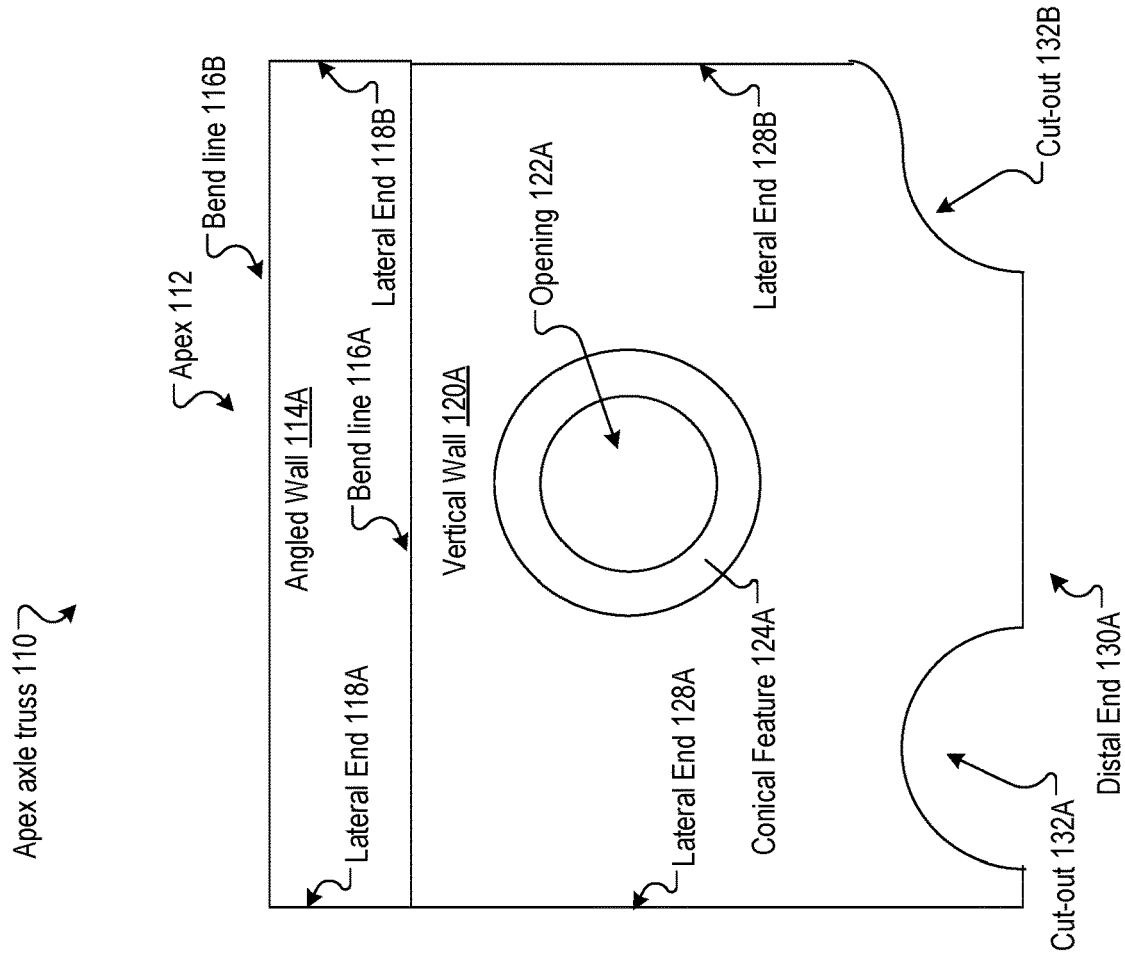
FIGS. 1A-B illustrate views of an apex axle truss, according to certain embodiments.

An apex axle truss system is described. An axle assembly of a vehicle may couple two wheels (e.g., two front wheels or two back wheels). The axle assembly may include a first axle shaft to couple with a first wheel (e.g., without a joint or with a joint, such as a universal joint (U-joint) or constant-velocity (CV) joint) and a second axle shaft to couple to a second wheel. A component (e.g., differential housing) may be disposed between the first axle shaft and the second axle shaft. First axle housing may surround the first axle shaft and may connect to (e.g., be welded to, plug welded to) the component (e.g., differential housing) between the first and second axle shafts on a first side of the component. Second axle housing may surround the second axle shaft and may connect to (e.g., be welded to, plug welded to) the component (e.g., differential housing) on a second side of the component. The first and second axle housings may be a tubular (e.g., cylindrical) shape that has a corresponding curved upper surface. A first coil spring bracket with a curved lower surface may interface with (e.g., be disposed on) the upper surface of the first axle housing and a second coil spring bracket (e.g., suspension bracketry) with a curved lower surface may interface with (e.g., be disposed on the upper surface of the second axle housing.

The axle assembly may span from proximate a first wheel to proximate a second wheel (e.g., from a first inner C to a second inner C, etc.). The axle assembly may be used for one or more of: transmitting driving torque to the wheels; maintaining position of the wheels relative to each other and to the vehicle body; bearing the weight of the vehicle plus any cargo; providing suspension; and/or providing steering.

Axle assemblies are designed for driving on even surfaces (e.g., pavement) at standard accelerations without the vehicle incurring any impacts (e.g., impacts resulting from jumping the vehicle, hitting a curb, an automobile accident, etc.). Responsive to a vehicle driving on uneven surfaces (e.g., dirt roads, washboard, rocks, potholes, off-roading), a vehicle undertaking sudden acceleration (e.g., peeling out, drag racing, etc.), a vehicle undergoing an impact (e.g., jumping the vehicle, hitting a curb, an accident), and/or the like, an axle assembly may become damaged. For example, an axle assembly may become bent, the axle housing may at least partially separate from one or more other components (e.g., the differential housing), etc. An original equipment manufacturer (OEM) axle assembly may be inherently weak for off-road activities and the like and may bend or break. A damaged axle assembly may cause a vehicle to be inoperable, may cause the occupants of the vehicle to be stranded and/or incur injury, may damage other components of the vehicle, may be costly and time-consuming to repair, and may require new parts.

Conventional solutions may include welding a series of metal plates together vertically and horizontally (e.g., forming a pi-shape (π-shape)) and then welding the welded metal plates to the axle housing to create a bridge along the axle housing. The welding of metal plates together and then to the axle housing may be time consuming and may cause additional potential failure points. Conventional trusses may not span the entire length of the axle and may only reinforce certain sections of the axle housing while other sections of the axle housing remain un-reinforced (e.g., providing a weakened area where failure may incur). Conventional solutions may including attaching the metal plates to the bottom or rear of the axle housing so as not to interfere with components that interface with the upper surface of the axle housing, such as the coil spring bracket. Metal plates attached to the bottom of the axle housing are in tension (e.g., stresses are trying to pull the plates apart) and metal plates attached to the rear of the axle housing are also partially in tension. The metal plates in tension may be weaker and have an increased thickness requirement compared to metal plates in compression. Metal plates attached to the bottom and rear of the axle housing are at least partially under the axle housing. The portion of the metal plates under the axle housing are to be a greater thickness and weight and have more welding to the axle housing to withstand impact with objects under the axle housing. The portion of the metal plates under the axle housing decreases ground clearance, thereby making off-roading more difficult.

Aspects of the present disclosure address the deficiencies of conventional axle assemblies by providing an apex axle truss system. In some embodiments, the apex axle truss system includes a first apex axle truss including a first substantially vertical wall, second substantially vertical wall, first angled wall, and second angled wall. In some embodiments, the first apex axle truss includes a sheet of metal shaped (e.g., bent) to form the first substantially vertical wall, second substantially vertical wall, first angled wall, and second angled wall. The first substantially vertical wall is configured to be secured (e.g., welded) to a first lateral side of an axle housing. The second substantially vertical wall is configured to be secured to (e.g., welded to a second lateral side of the axle housing. The first angled wall is disposed between the first substantially vertical wall and the second substantially vertical wall. The second angled wall is disposed between the first angled wall and the second substantially vertical wall. The first angled wall and the second angled wall form an apex that is configured to be disposed over an upper surface of the axle housing. In some embodiments, the first apex axle truss of the apex axle truss system is sized and shaped to be disposed under a coil spring bracket disposed on the axle housing (e.g., a first portion of the coil spring bracket is disposed on the first apex axle truss and one or more second portions of the coil spring bracket interface with the axle housing).

In some embodiments, the apex axle truss system includes an apex differential truss that includes a first angled wall and a second angled wall. In some embodiments, the apex differential truss includes a sheet of metal that has been bent to form the first angled wall and the second angled wall. The first angled wall includes a first distal end configured to be secured to a first portion of a differential housing. The second angled wall includes a second distal end configured to be secured to a second portion of a differential housing. In some embodiments, the apex axle truss system further includes suspension bracketry (e.g., configured to connect to one or more control arms to prevent axle housing movement) secured to an upper surface of the apex differential truss.

In some embodiments, the apex axle truss system includes an apex coil spring bracket truss including a flat upper wall, a first angled wall, a first substantially vertical wall, a second angled wall, and a second substantially vertical wall. In some embodiments, the apex coil spring bracket truss includes a sheet of metal that has been bent to form the flat upper wall, the first angled wall, the first substantially vertical wall, the second angled wall, and the second substantially vertical wall. The flat upper wall is configured to be disposed over an axle housing. In some embodiments, the flat upper wall is configured to interface with a coil spring. The first angled wall is configured to be secured (e.g., welded) to a first lateral side of the axle housing. The first substantially vertical wall is disposed between the first angled wall and the flat upper wall. The second angled wall is configured to be secured (e.g., welded) to a second lateral side of the axle housing. The second substantially vertical wall is disposed between the second angled wall and the flat upper wall.

Aspects of the present disclosure have advantages over conventional systems. The apex axle truss system increases the strength of an axle assembly. Responsive to the apex axle truss being a sheet of metal that has been bent, the apex axle truss system may be stronger, have less points of potential failure, and be easier to manufacture than conventional systems that are made of metal plates welded together. Responsive to the apex axle truss having an apex, the apex axle truss system may be stronger than conventional systems that have a flat upper surface welded to sidewalls (e.g., where the flat upper surface perpendicular to the sidewalls). Responsive to the apex of the apex truss being disposed on an upper surface of axle housing, the apex axle truss system is to be in compression (e.g., pushing the components of the apex axle truss system together) which is stronger than a conventional system that has a truss disposed on the bottom or rear of an axle housing (e.g., where the components would be in tension). The apex axle truss system in compression may be stronger than and/or not as thick as conventional systems that have trusses disposed on the bottom or rear of the axle housing. The apex axle truss system may span substantially the entire length of the axle assembly (e.g., including the coil spring brackets) which has an increased strength and reinforcement compared to conventional systems that have trusses that do not span substantially the entire length of the axle assembly (e.g., do not span the portion of the axle assembly corresponding to the coil spring brackets). The apex axle truss system may be less complex and may be installed with less welding, resulting in a stronger system with less potential points of failure compared to a conventional system. The apex axle truss system of the present disclosure provides the increased strength of an apex shape (e.g., without welding) and the increased strength of the apex axle truss system being in compression while still providing suspension (e.g., interfacing with coil spring bracketry).

The apex axle truss system minimizes components (e.g., has no components) under the axle housing and differential housing. By minimizing components under the axle housing and differential housing, the apex axle truss system can have a smaller thicknesses, less weight, and less welding than conventional systems. By minimizing components under the axle housing and differential housing, the apex axle truss system provides greater ground clearance than conventional systems. By providing greater ground clearance, the apex axle truss system makes off-roading easier than with conventional systems.

In some embodiments, the apex axle truss system provides suspension bracketry secured to the apex differential truss to better prevent axle housing movement (e.g., prevent frontward, rearward, and rotational movement of the axle assembly) than conventional systems that do not have suspension bracketry or that have a weak connection of suspension bracketry to the differential housing that is prone to breaking. The apex axle truss system provides suspension bracketry secured closer to the differential housing via the apex differential truss which provides greater clearance between the suspension bracketry and other components (e.g., oil pan) to reduce damage to the other components.

The apex axle truss system may be simple to manufacture and use. The apex axle truss system may have a reduction in installation time due to less welding and may have inherent stability of the overall structure allowing lighter material thickness to be used.

Figure 1A:
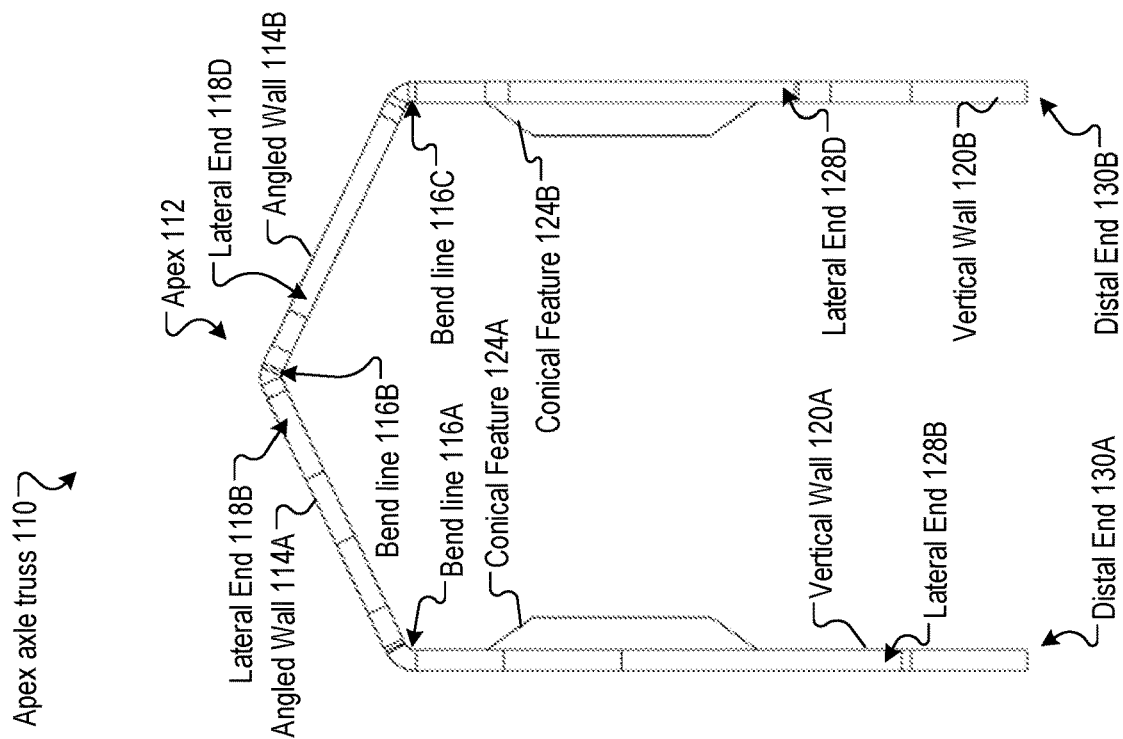

FIGS. 1A-B illustrate views of an apex axle truss 110 (e.g., of an apex axle truss system), according to certain embodiments. FIG. 1A is a side view of the apex axle truss 110, according to certain embodiments. FIG. 1B is a front view of the apex axle truss 110, according to certain embodiments. In some embodiments, an apex axle truss system includes multiple apex axle trusses 110 (e.g., apex axle truss, apex differential truss, apex coil spring bracket truss, etc.). In some embodiments, the multiple apex axle trusses 110 run from end to end of the axle (e.g., from inner C to inner C, over the first axle housing and the second axle housing, etc.) for full axle reinforcement (e.g., when used with inner C gussets). In some embodiments, apex axle truss 110 extends under the coil spring bracket (e.g., under OEM coil spring bucket, apex axle truss 110 is welded in between the coil spring bracket and the axle housing). In some embodiments, the apex axle truss system provides an apex coil spring bracket truss (e.g., to interface with the coil spring) and/or an apex differential truss (e.g., to be disposed over the differential housing).

The apex axle truss 110 includes an apex 112 that includes angled walls 114A-B. The apex 112 is configured to be disposed over an upper surface of an axle housing (e.g., axle tube). The peaked apex shape of apex 112 provides more rigidity than a flat top truss.

In some embodiments, the apex axle truss 110 includes a vertical wall 120A configured to be secured (e.g., welded) to a first lateral side of the axle housing and a second substantially vertical wall 120B configured to secured (e.g., welded) to a second lateral side of the axle housing. The angled wall 114A is disposed between the vertical wall 120A and the angled wall 114B. The angled wall 114B is disposed between the angled wall 114A and the vertical wall 120B. As used in the present disclosure, a vertical wall refers to a wall that is substantially vertical. In some embodiments, a vertical wall is in a plane that is at about 90 degrees from a horizontal plane. In some embodiments, a vertical wall is in a plane that is about 80 degrees from a horizontal plane. In some embodiments, a vertical wall is in a plane that is about 85 degrees from a horizontal plane. In some embodiments, the vertical wall is in a plane that is 85-95 degrees from a horizontal plane. In some embodiments, the vertical wall is in a plane that is 80-100 degrees from a horizontal plane.

In some embodiments, the apex axle truss 110 includes a sheet of metal that has been shaped (e.g., bent, folded, machined, molded, etc.) for form an apex 112. In some examples, the sheet of metal has a bend line 116A between the vertical wall 120A and the angled wall 114A, has a bend line 116B between the angled wall 114A and the angled wall 114B, and has a bend line 116C between the angled wall 114B and vertical wall 120B. In some embodiments, bend lines 116A and 116C are substantially in the same horizontal plane and the bend line 116B is in a vertical plane that is substantially perpendicular to the horizontal plane. In some embodiments, bend lines 116A-C are parallel to each other.

In some embodiments, the apex axle truss 110 is made of a single sheet of metal. The formed single-piece construction has higher strength than welded three-piece construction and is faster to install and has less warping due to less heat from welding. In some embodiments, the apex axle truss 110 includes two or more sheets of metal that have been joined together.

In some embodiments, vertical wall 120A and/or vertical wall 120B forms one or more corresponding openings 122. In some embodiments, vertical wall 120A includes a conical feature 124A that forms an opening 122 (e.g., dimpled hole). In some embodiments, the openings 122 in the sheet of metal are pressed in a cone shape using a dimple die for more strength. The opening 112A (e.g., dimpled hole) pushes material into a conical shape (e.g., conical feature 124A, hollow conical frustum, truncated hollow right circular cone, etc.) that thickens the material for extra rigidity.

Angled wall 114A has a perimeter including bend line 116A, lateral end 118A, bend line 116B, and lateral end 118B. Angled wall 114B has a perimeter including bend line 116C, lateral end 118C, bend line 116B, and lateral end 118D.

Vertical wall 120A has a perimeter including bend line 116A, lateral end 128A, distal end 130A, and lateral end 128B. Vertical wall 120A has a perimeter including bend line 116C, lateral end 129C, distal end 130B, and lateral end 128D.

In some embodiments, one or more of distal ends 130A-B, lateral ends 118A-D, and/or lateral ends 128A-D has one or more cut-outs 132. In some embodiments, the apex axle truss 110 includes cut-outs 132 (e.g., cut-out contour) around one or more features of the axle assembly, such as OEM coil spring bracket, OEM center axle disconnect (CAD) or front axle disconnect (FAD) casting, OEM upper control arm bracket, OEM differential (e.g., differential housing, differential casting), and/or the like.

In some embodiments, one or more of distal ends 130A-B, lateral ends 118A-D, and/or lateral ends 128A-D is secured (e.g., welded) to one or more other components (e.g., another apex axle truss 110, an apex differential truss, an apex coil bracket truss, axle housing, differential housing, coil spring bracket, inner c gusset, etc.). In some examples, distal end 130A, lateral end 128A, and/or lateral end 128B is welded to a first lateral side of the axle housing and distal end 130B, lateral end 128C, and/or lateral end 128D is welded to a second lateral side of the axle housing. In some embodiments, only distal end 130A and distal end 130B are welded to the axle housing. In some examples, one or more of lateral ends 118A, 118C, 128A, and/or 128C are interlocked with and/or welded to a second apex axle truss and/or one or more of lateral ends 118B, 118D, 128B, and/or 128D are interlocked with and/or welded to a third apex axle truss.

FIGS. 2A-G illustrate a system 200 including an apex axle truss system 202 and an axle assembly 220, according to certain embodiments. In some embodiments, features in FIGS. 2A-G with similar numbering as those of FIG. 1A and/or FIG. 1B have the same or similar structure and/or functionalities as those of FIG. 1A and/or FIG. 1B.

Figure 2C:
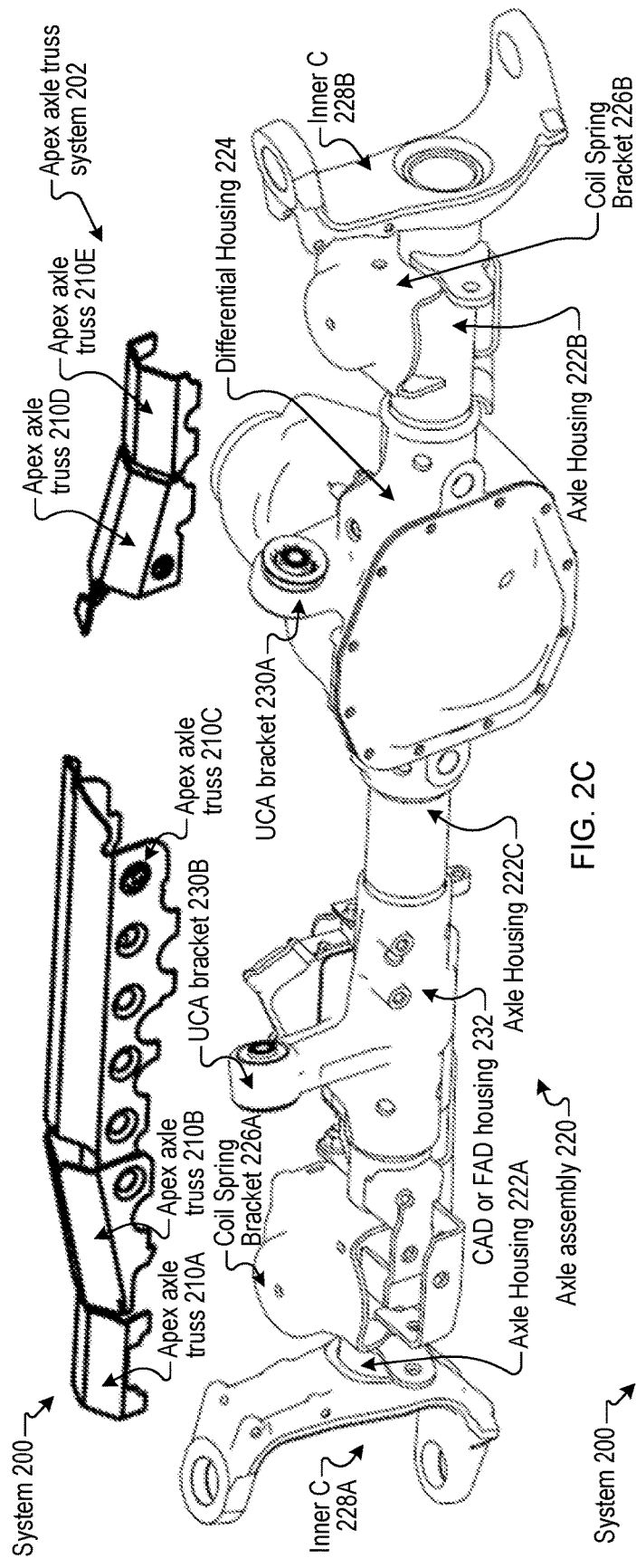
Figure 2D:
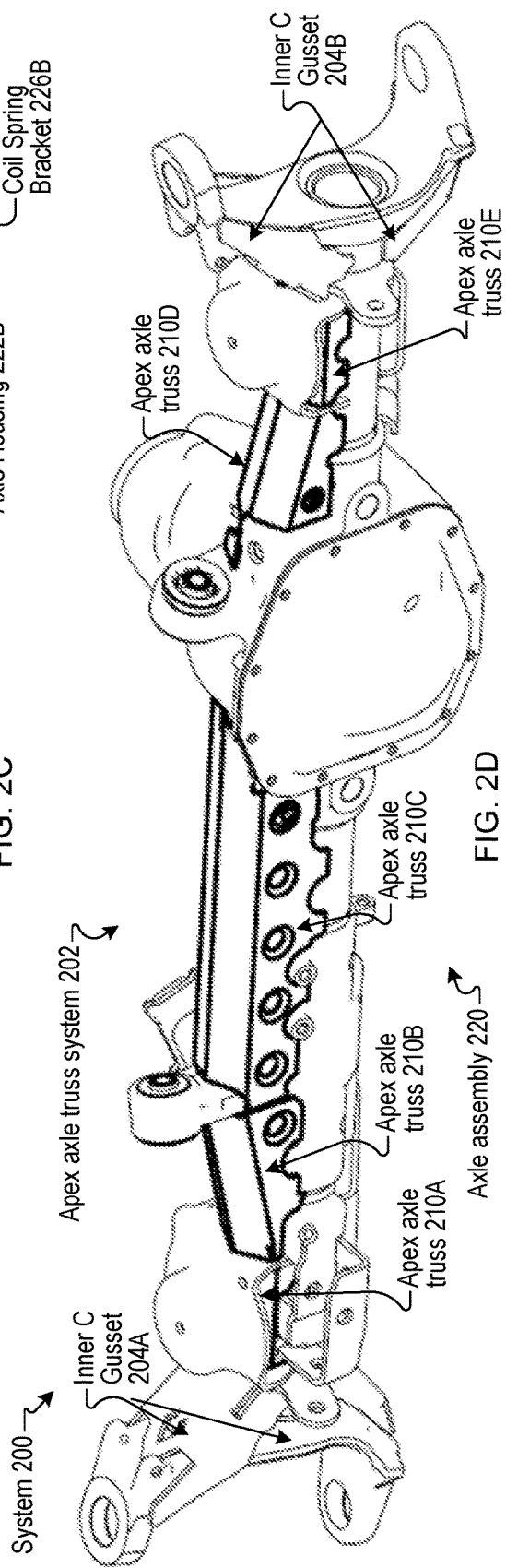

FIG. 2A is an exploded front view of the system 200, according to certain embodiments. FIG. 2B is an assembled front view of the system 200, according to certain embodiments. FIG. 2C is an exploded perspective view of the system 200, according to certain embodiments. FIG. 2D is an assembled perspective view of the system 200, according to certain embodiments.

Axle assembly 220 includes one or more components. In some embodiments, axle assembly 220 includes axle housing 222A-C, axles (e.g., axle shafts) disposed in the axle housing 222A-C, differential housing 224 attached to the axle housing 222, differential (not shown) disposed in the differential housing 224, coil spring brackets 226A-B disposed on the axle housing 222, inner C 228A-B attached to the axle housing 222, suspension bracketry (e.g., upper control arm (UCA) bracket 230A-B), and/or the like. In some embodiments, the axle assembly 220 further includes a center axle disconnect (CAD) or front axle disconnect (FAD) housing 232 connected to the axle housing 222.

In some embodiments, a first axle (e.g., axle shaft) extends from the inner C 228A to the differential in the differential housing 224 and a second axle (e.g., axle shaft) extends from the inner C 228B to the differential disposed in the differential housing 224.

In some embodiments, the first axle extends from the inner C 228A through axle housing 222A to differential housing 224. In some embodiments, the first axle extends from the inner C 228A through axle housing 222A to CAD or FAD housing 230 to axle housing 222C to differential housing 224. The second axle extends from the inner C 228B through axle housing 222B to the differential housing 224. In some embodiments, one or more first axles extend from the inner C 228A to the differential and/or one or more first axles extend from the differential to the inner C 228B. In some examples, a first axle extends from the inner C 228A to the CAD or FAD housing 232, a second axle extends from the CAD or FAD housing 232 to the differential housing 224.

The axle housing 222 (e.g., axle tube) is cylindrical and is configured to prevent damage to the axles. In some embodiments, the axle housing 222A is secured (e.g., welded) to the inner C 228A and the differential housing 224. In some embodiments, the axle housing 222A is secured (e.g., welded) to the inner C 228A and the CAD or FAD housing 232 and the axle housing 222B is secured (e.g., welded) to the CAD or FAD housing 232 and the differential housing 224. The axle housing 22B is secured (e.g., welded) to the differential housing 224 and the inner C 228B. The coil spring bracket 226A is disposed on (e.g., secured to, welded to, etc.) the axle housing 222A. The coil spring bracket 226B is disposed on (e.g., secured to, welded to, etc.) the axle housing 222B.

The axle may extend through the axle housing 222 and inner C 228 (e.g., axle knuckle, inner knuckle, etc.) to couple to a joint, such as a universal joint (U-joint), a constant-velocity (CV) joint, and/or the like. In some embodiments, the inner C 228 is the final outer piece of the axle assembly 220. Beyond the inner C 228 are moving pieces (e.g., U-joint, CV joint, etc.) which may not be strengthened by the apex axle truss system 202.

The coil spring bracket 226 (e.g., coil spring bucket) has a cylindrical protrusion attached to the upper surface of the coil spring bracket 226. The cylindrical protrusion centers the coil spring on the coil spring bracket 226. The coil spring bracket may have one or more rounded features shaped to interface with the rounded upper surface of the axle housing 222.

In some embodiments, the axle assembly 220 includes an axle disconnect system (e.g., CAD system or a FAD system) housed by the CAD or FAD housing 230 (e.g., CAD or FAD casting). An axle disconnect system may be used in front drive axles on four wheel drive vehicles, where the axle shaft is split into a first piece connected to the differential and a second piece connected to the wheel. The axle disconnect system engages the axle by connecting the two split axle shafts. In some embodiments, the CAD or FAD housing 230 is made of cast iron or cast steel.

The differential housing 224 (e.g., differential casting) houses a gear train that is coupled to the drive shaft and the axles. The differential may drive a pair of wheels (e.g., via the axles) while allowing them to rotate at different speeds.

Certain movements of the components of the axle assembly 220 cause damage to the axle assembly 220 and may cause damage to the vehicle and/or users (e.g., driver and passengers). For example, if the axle assembly 220 were to move forward, backward, or rotate, damage may occur. Suspension bracketry (e.g., UCA bracket 230) is used to prevent certain movement of the axle assembly 220. The UCA bracket 230A is secured to (e.g., integral to, welded to, etc.) the differential housing 224. In some embodiments, the UCA bracket 230A is secured to (e.g., integral to, welded to, etc.) the CAD or FAD housing 230. The UCA brackets 230A-B are configured to connect to one or more control arms to prevent axle housing movement (e.g., prevent forward movement, rearward movement, rotation, etc. of the axle assembly 220). The one or more control arms are configured to connect to brackets on a vehicle frame.

The apex axle truss system 202 reinforces and prevents damage to axle assemblies 220, including current axle assemblies (e.g., OEM front axle, OEM rear axle, etc.), custom axle assemblies, and future axle assemblies. The apex axle truss system 202 reinforces the axle assembly 220 to withstand forces resulting from driving on uneven surfaces, sudden acceleration, impact, and/or the like.

The apex axle truss system 202 includes one or more apex axle trusses 210 (e.g., apex axle truss 110 of FIG. 1). In some embodiments, the apex axle truss system 202 includes apex axle trusses 210A-E (hereinafter apex axle trusses 210) that span from a first distal end of the axle assembly 220 (e.g., proximate a first wheel, the inner C 228A) to a second distal end of the axle assembly 220 (e.g., proximate a second wheel, the inner C 228B). In some embodiments, the apex axle trusses 210 are shaped to interlock with each other. The apex axle trusses 210 are configured to be secured (e.g., welded) to the axle housing 222. The apex axle trusses 210 may be welded to each other. One or more of the apex axle trusses 210 are configured to be secured (e.g., welded) to one or more components of the axle assembly 220 (e.g., differential housing 224 disposed between the axle housing 222A or 222C and the axle housing 222B).

In some embodiments, each apex axle truss 210 is a sheet of metal that has been bent to form a first substantially vertical wall (e.g., vertical wall 120A of FIGS. 1A-B), a second substantially vertical wall (e.g., vertical wall 120B of FIG. 1A), and two or more walls (e.g., angled walls 114A-B of FIG. 1A) between the first substantially vertical wall and the second substantially vertical wall. For example, an apex axle truss 210 may have three bends (e.g., bend lines 116A-C of FIG. 1A) forming a first substantially vertical wall, a second substantially vertical wall, a first angled wall (e.g., angled wall 114A of FIG. 1A), and a second angled wall (e.g., angled wall 114B of FIG. 1B), where the first angled wall and second angled wall form an apex (e.g., apex 112 of FIGS. 1A-B). A first bend (e.g., bend line 116A of FIGS. 1A-B) may be between the first substantially vertical wall and the first angled wall, a second bend (e.g., bend line 116B of FIGS. 1A-B) may be between the first angled wall and the second angled wall, and a third bend (e.g., bend line 116C of FIG. 1A) may be between the second angled wall and the second substantially vertical wall. Each of the bends may be parallel to each other. In some embodiments, the apex axle truss 210 may include greater than three bends forming first and second substantially vertical walls and greater than two angled walls disposed between the first and second substantially vertical walls, wherein the greater than two angled walls form a multi-point apex.

One example of an apex axle truss system 202 is shown in FIGS. 2A-D. The apex axle truss system 202 may be shaped and sized for different types of axle assemblies 220. For example, an apex axle truss system 202 may be shaped and sized for a front axle assembly, a rear axle assembly, axle assemblies of a sport utility vehicle (SUV), axle assemblies of a truck, axle assemblies of a semi-trailer truck, axle assemblies of construction vehicles, axle assemblies of farming vehicles, axle assemblies of muscle vehicles, axle assemblies of racing vehicles, axle assemblies of off-roading vehicles, axle assemblies of front-wheel drive vehicles, axle assemblies of rear-wheel drive vehicles, axle assemblies of four-wheel or all-wheel drive vehicles, axle assemblies of taller vehicles, axle assemblies of vehicles with after-market wheels that are larger than the original wheels, and/or the like.

Metal material (e.g., sheet of metal) may be cut into a shape and bent so as to have four or more sides (e.g., three or more bends all parallel to each other, bend lines 116A-C of FIG. 1A, etc.) creating two vertical surfaces on opposite sides with a taller section in the middle. The design of the structure height, width, length, and clearance cutouts (e.g., cut-outs 132 of FIG. 1B) can all be adjusted independently so as to accommodate different sizes of drive axles (e.g., axle assemblies 220). The overall length of the apex axle truss system 202 may be designed so as to span from one side of the (e.g., axle assembly 220 (e.g., drive axle) over the center differential section (e.g., differential housing 224) to the other side of the axle assembly 220. The truss structure of the apex axle trusses 210 the apex axle truss system 202 may then be placed on the axle assembly 220 (e.g., drive axle) and welded to each side of the axle housing 222 (e.g., axle tube) at or above the midpoint of the axle tube. The overall shape of the apex axle truss system 202 provides increased stability, better ground clearance under the vehicle, and ease of installation which in turn provides greater value to the user.

Conventionally, one or more components may interface with an upper surface of the axle housing. For example, a coil spring bracket 226 (e.g., conventional coil spring bracket, new coil spring bracket) may have a curved lower surface that is sized and shaped to interface with a curved upper surface of the axle housing 222. The apex axle trusses 210 have an angled upper surface (e.g., an apex upper surface).

In some embodiments, the apex axle truss system 202 may include a coil spring bracket 226 that has an angled lower surface (e.g., reverse apex upper surface) that is sized and shaped to interface with the apex axle truss 210.

In some embodiments, the apex axle truss system 202 may form one or more slots (e.g., slot cut into the apex axle truss 210, slot formed by two interlocking apex axle trusses 210) for receiving the coil spring bracket 226. The slot may be located and sized in the apex axle truss system 202 to positively locate the coil spring bracket 226 in relation to the apex axle truss 210. The coil spring bracket 226 may have a curved lower surface (e.g., sized and shaped to interface with an upper surface of the axle housing 222) that enters through a slot in the apex axle truss system 202 (e.g., apex axle truss 210, etc.) to interface with the curved upper surface of the axle housing 222.

In some embodiments, the apex axle trusses 210 span across the axle assembly 220, leaving a slot above the upper surface of the axle housing 222 and that is between a first apex axle truss 210 and a second apex axle truss 210 to receive a curved surface of the coil spring bracket 226 to interface with an upper surface of the axle housing 222. For example, apex axle trusses 210A-B are sized and shaped to receive a portion of the corresponding coil spring bracket 226A and apex axle trusses 210D-E are sized and shaped to receive a portion of the corresponding coil spring bracket. Apex axle truss 210A may be sized and shaped to extend under the corresponding coil spring bracket 226A and the apex axle truss 210E may be sized and shaped to extend under the corresponding coil spring bracket 226B.

In some embodiments, the coil spring bracket 226 is coupled to (e.g., welded to) one or more apex axle trusses 210 and/or the axle housing 222.

In some embodiments, an apex axle truss system 202 including the apex axle trusses 210 and coil spring brackets 226 may be part of a kit to be attached to the axle assembly 220 of an existing vehicle. In some embodiments, the coil spring bracket 226 (under which an apex axle truss 210 is to be disposed) is OEM. In some embodiments, the coil spring bracket 226 (under which an apex axle truss 210 is disposed) is custom made.

The apex axle truss system 202 may be configured to interface with other components in addition to or instead of coil spring brackets 226 (e.g., portions of the CAD or FAD housing, suspension bracketry, such as UCA bracket 230, etc.). The apex axle trusses 210 may be sized and shaped (e.g., have cut-outs 132 of FIG. 1B) to go around existing portions of the axle assembly 220.

In some embodiments, the apex axle trusses 210 may be made of ¼-inch thick mild steel. In some embodiments, the apex axle trusses 210 may be made of 3/16-inch thick mild steel. In some embodiments, the apex axle trusses 210 may be made of ⅛-inch thick mild steel. In some embodiments, the apex axle trusses 210 are thinner than (e.g., have about half the thickness of) conventional trusses while providing the same or greater reinforcement to the axle assembly 220. In some embodiments, one or more portions of the apex axle truss system 202 has a thickness (e.g., thickness of the sheet of metal) that is about 0.25 inches. In some embodiments, one or more portions of the apex axle truss system 202 has a thickness (e.g., thickness of the sheet of metal) that is about 0.1875 inches In some embodiments, one or more portions of the apex axle truss system 202 has a thickness (e.g., thickness of the sheet of metal) that is about 0.125 inches In some embodiments, one or more portions of the apex axle truss system 202 has a thickness (e.g., thickness of the sheet of metal) that is about 0.120 inches. In some embodiments, one or more portions of the apex axle truss system 202 has a thickness (e.g., thickness of the sheet of metal) that is about 0.1 to 0.2 inches. In some embodiments, one or more portions of the apex axle truss system 202 has a thickness (e.g., thickness of the sheet of metal) that is about 0.2 to 0.3 inches. In some embodiments, one or more portions of the apex axle truss system 202 has a thickness (e.g., thickness of the sheet of metal) that is about 0.3 to 0.5 inches.

In some embodiments, an apex axle truss system 202 may be installed both on top of the axle assembly 220 (e.g., as shown in FIGS. 2A-D) and on the bottom of the axle assembly 220 (e.g., similar to the apex axle truss system 202 shown in FIGS. 2A-D but on the bottom surface of the axle assembly 220). For an axle assembly 220 that includes an apex axle truss system 202 on top and on bottom of the axle assembly 220, a thinner thickness of metal for the apex axle trusses 210 may be used and/or a metal of a lower strength may be used.

Figure 2G:
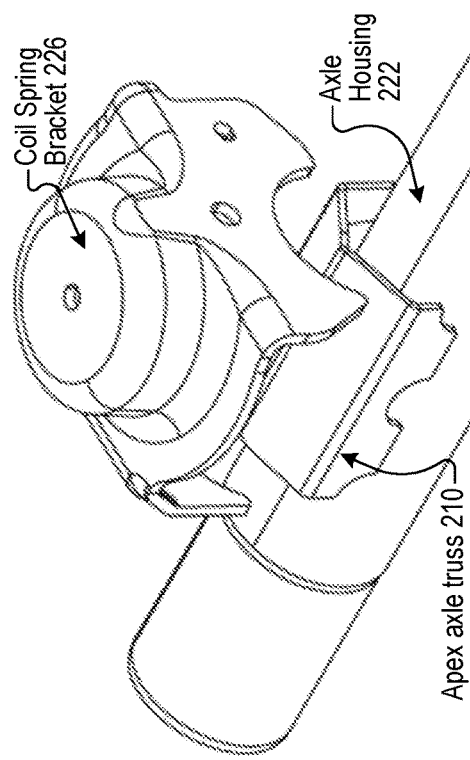
FIGS. 2E-H illustrate views of a coil spring bracket, apex axle truss, and axle housing of a system, according to certain embodiments.
Figure 2H:
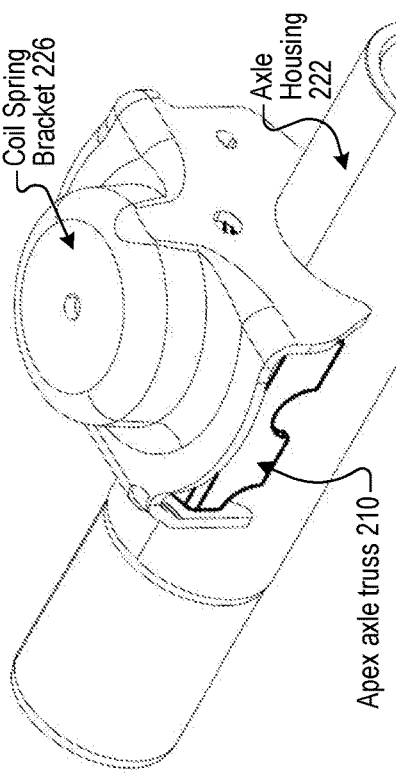
Figure 2E:
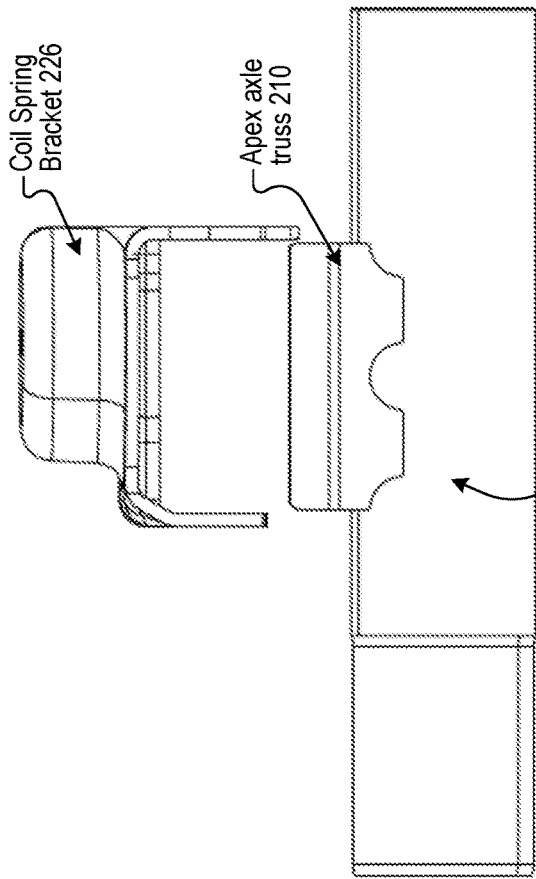
Figure 2F:
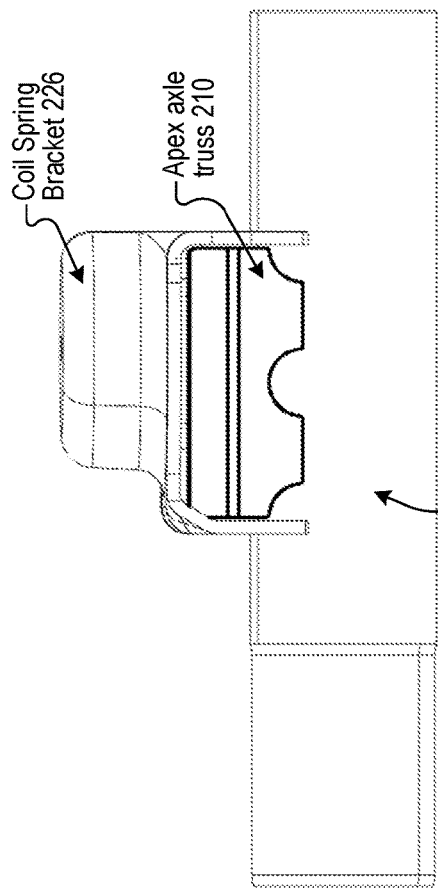

FIGS. 2E-H illustrate views of coil spring bracket 226, apex axle truss 210, and axle housing 222 of a system 200, according to certain embodiments. FIG. 2E is an exploded front view of the coil spring bracket 226, apex axle truss 210, and axle housing 222 of system 200. FIG. 2F is an assembled front view of the coil spring bracket 226 mounted on the axle housing over the apex axle truss 210 of system 200. FIG. 2G is an exploded perspective view of the coil spring bracket 226, apex axle truss 210, and axle housing 222 of system 200. FIG. 2H is an assembled perspective view of the coil spring bracket 226 mounted on the axle housing over the apex axle truss 210 of system 200.

The apex axle truss 210 may extend under the coil spring bracket 226. Conventional truss designs do not extend under the coil spring bracket, creating a stress point under the coil spring bracket where the axle housing is not reinforced and results in failure of the axle assembly. The apex axle truss system 202 extends under the coil spring bracket 226, thus providing full reinforcement end-to-end of the axle. In some embodiments, the apex axle truss 210 is welded in between the coil spring bracket 226 and the axle housing 222.

Figure 3A:
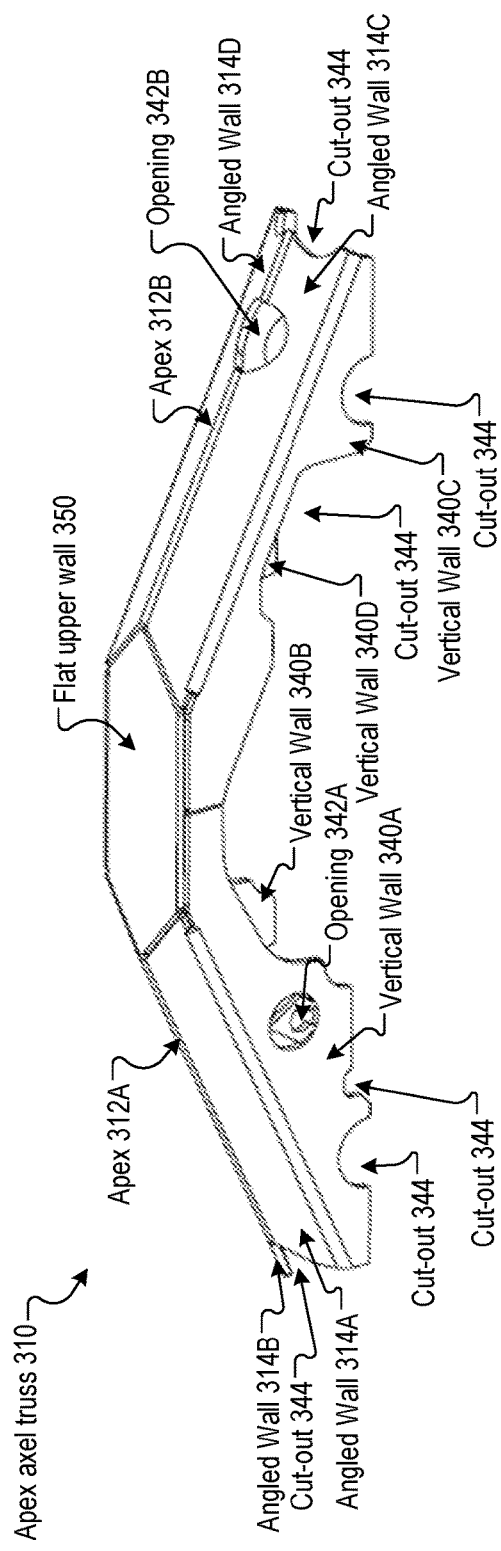
Figure 3B:
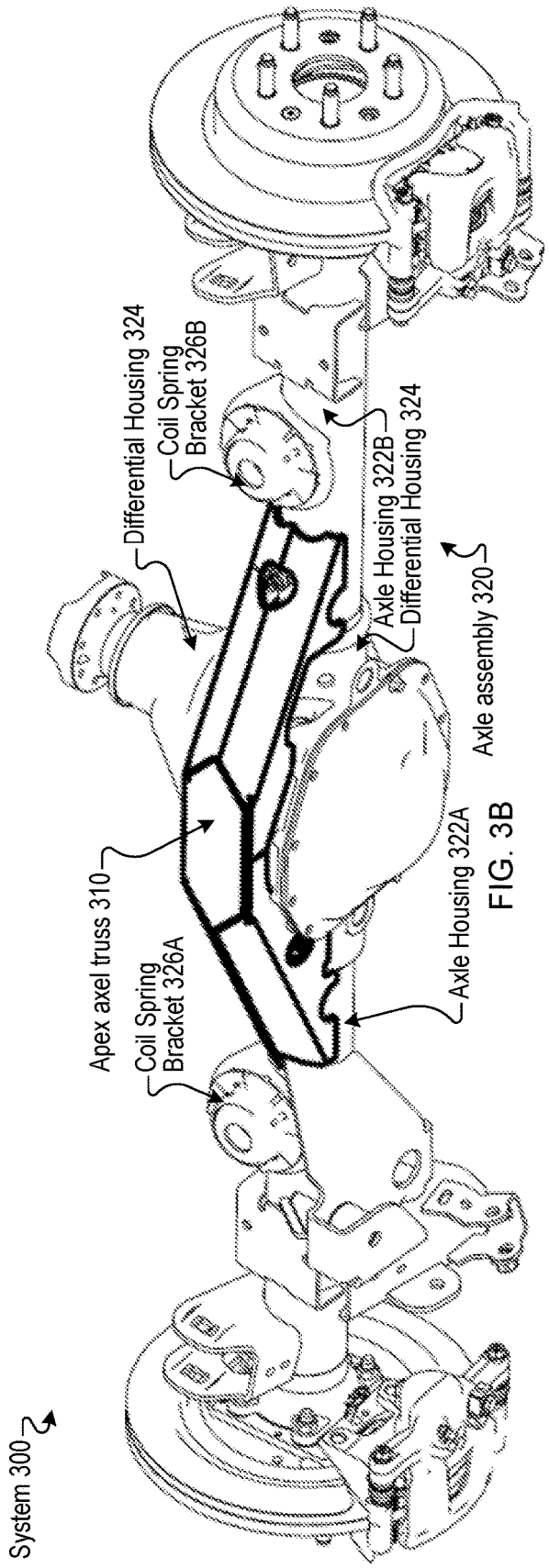

FIGS. 3A-D illustrate an apex axle truss 310 of an apex axle truss system 302 of system 300, according to certain embodiments. FIG. 3A illustrates the apex differential truss 310, according to certain embodiments. FIG. 3B illustrates an assembled perspective view of a system 300 including an apex axle truss system 302 and an axle assembly 320, according to certain embodiments. FIG. 3C illustrates an exploded front view of a system 300 including an apex axle truss system 302 and an axle assembly 320, according to certain embodiments. FIG. 3D illustrates an assembled front view of a system 300 including an apex axle truss system 302 and an axle assembly 320, according to certain embodiments. Features with similar reference numbers as those in one or more of FIGS. 1A-2G may have the same or similar structure or function as those described in conjunction with one or more of FIGS. 1A-2G.

In some embodiments, apex axle truss 310 (e.g., apex differential truss) is configured to be disposed over at least a portion of axle housing 322A-B (e.g., axle housing 222A-B of FIGS. 2A-G) and at least a portion of differential housing 324 (e.g., differential housing 224A-B of FIGS. 2A-D). In some embodiments, apex axle truss 310 is referred to as an apex differential truss. In some embodiments, apex axle truss 310 is configured to secure (e.g., weld) to one or more portions of axle housing 322A-B and differential housing 324. In some embodiments, apex axle truss 310 is configured to be disposed adjacent to, interlock with, secure (e.g., weld) to, and/or the like one or more apex axle trusses (e.g., one or more apex axle trusses 210 of FIGS. 2A-G).

Apex axle truss 310 includes one or more sheets of metal that have been bent to form a flat upper wall 350 and angled walls 314A-D (e.g., angled walls 114 of FIGS. 1A-B). The angled walls 314A-D form apex 312 (e.g., apex 112 of FIGS. 1A-B). In some embodiments, the one or more sheets of metal of apex axle truss 310 have further been bent to form vertical walls 340A-D (e.g., vertical walls 120 of FIGS. 1A-B). In some embodiments, one or more of angled walls 314A-D, flat upper wall 350, and/or vertical walls 340A-D form openings 342 (e.g., opening 122A of FIG. 1B) and/or cut-outs 344 (e.g., cut-outs 132A-B of FIG. 1B).

In some one or more of the angled walls 314A-D and/or vertical walls 340A-D are configured to be secured (e.g., welded) to the differential housing 324 and/or the axle housing 322A-B.

In some embodiments, a suspension bracketry (e.g., UCA bracket 230A of FIGS. 2A-D) is secured to (e.g., welded to, integral to, fastened to, etc.) an upper surface of the flat upper wall 350. The suspension bracketry is configured to connect one or more control arms to prevent axle housing movement (e.g., prevent frontward movement, rearward movement, and/or rotation). The control arms are configured to connect to brackets on the vehicle (e.g., vehicle frame).

In some embodiments, the suspension bracketry is more securely attached to (e.g., less likely to disengage from) the apex axle truss 310 of system 300 than in conventional systems (e.g., mounting the suspension bracketry directly to the differential housing). In some embodiments, suspension bracketry secured to the upper surface of the flat upper wall 350 provides more clearance from vehicle components (e.g., oil pan) and is less likely to cause damage than conventional systems.

FIGS. 4A-J illustrate an apex axle truss system 402 of a system 400, according to certain embodiments. Features with similar reference numbers as those in one or more of FIGS. 1A-3D may have the same or similar structure or function as those described in conjunction with one or more of FIGS. 1A-3D.

Figure 4A:
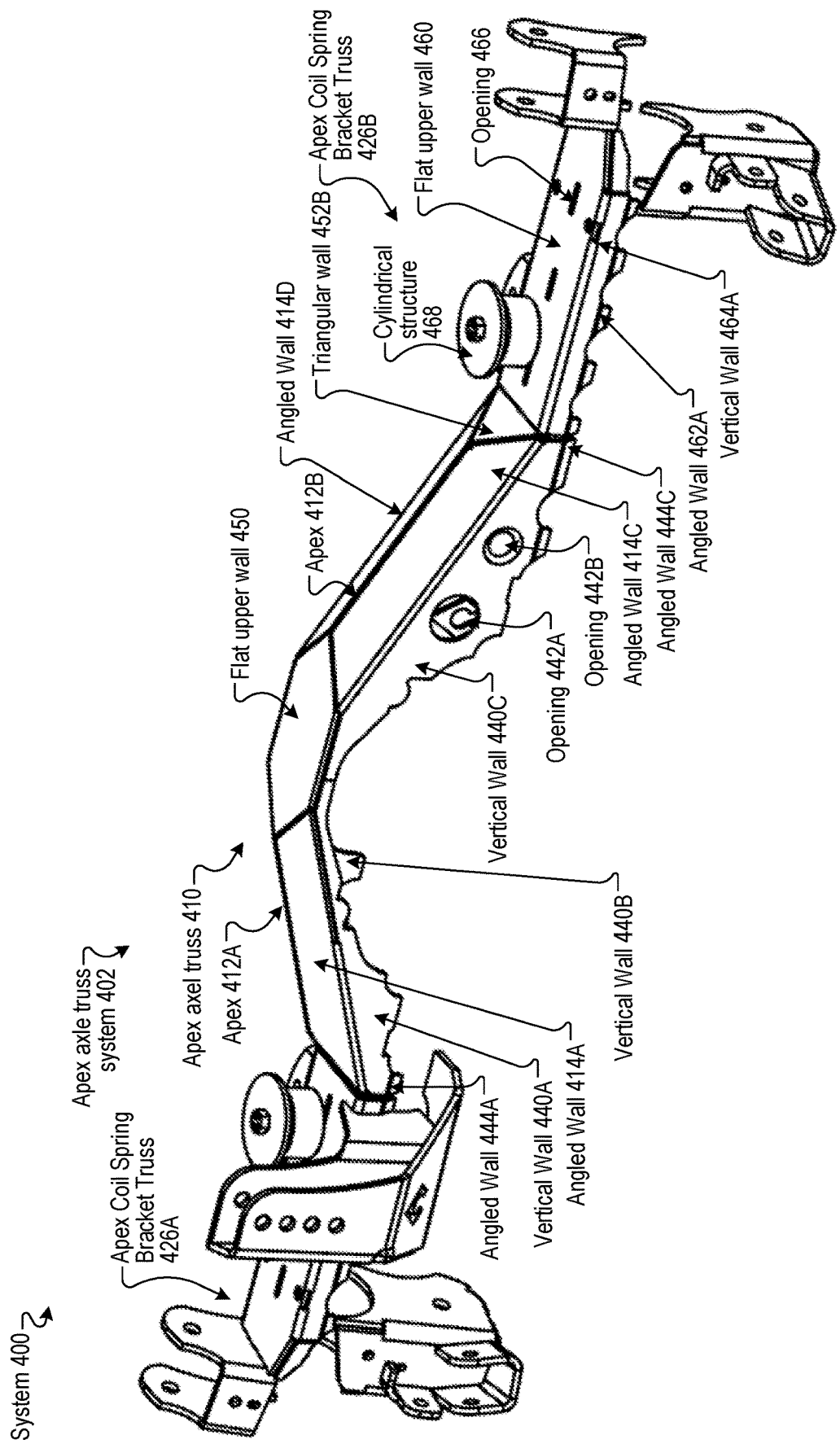

FIG. 4A illustrates a front perspective view of the apex axle truss system 402, according to certain embodiments. The system 400 includes an apex axle truss system 402 including an apex axle truss 410 (e.g., apex differential truss, apex axle truss 310 of FIGS. 3A-D) and apex coil spring bracket trusses 426A-B. The apex axle truss 410 is configured to be placed adjacent to, interlock with, and/or secure (e.g., weld, fasten, etc.) to the apex coil spring bracket trusses 426A-B.

The apex axle truss 410 is similar to the apex axle truss 310 of FIGS. 3A-D. The apex axle truss 410 includes a flat upper wall 450 and angled walls 414A-D forming apex 412A-B. In some embodiments, apex axle truss 410 includes vertical walls 440A-D. The apex axle truss 410 (e.g., one or more vertical walls 440A-D) include one or more openings 442 and one or more cut-outs.

In some embodiments, the apex axle truss 410 includes a triangular wall 452 that has a three-sided perimeter. The first side of the three-sided perimeter borders angled wall 414C, the second side of the three-sided perimeter borders angled wall 414D, and the third side of the three-sided perimeter is configured to be secured to the flat upper wall 460 of the apex coil spring bracket truss 426B.

The apex coil spring bracket truss 426 includes a flat upper wall 460, angled walls 462A-B, and vertical walls 464A-B. The flat upper wall 460 is configured to be disposed over the axle housing 422. The angled wall 462A angled towards and configured to be secured (e.g., welded) to a first lateral side of the axle housing 422. The vertical wall 464A is disposed between the angled wall 462A and the flat upper wall 460. The angled wall 462B angled towards and configured to be secured (e.g., welded) to a second lateral side of the axle housing 422. The vertical wall 464B is disposed between the angled wall 462B and the flat upper wall 460. In some embodiments, the flat upper wall 460 forms one or more openings 466. The flat upper wall 460 is to be secured (e.g., welded) to an upper surface of the axle housing 422 via the one or more openings 466.

In some embodiments, a cylindrical structure 468 is disposed on an upper surface of the flat upper wall 460 (e.g., secured to the flat upper wall 460 via one or more openings 466 of the flat upper wall 460). The cylindrical structure 468 is configured to locate a coil spring on the apex coil spring bracket truss 426 (e.g., on the flat upper wall 460). The apex coil spring bracket truss 426A and 426B may be substantially identical.

One or more components (e.g., brackets, skids, etc.) may be secured to the apex coil spring bracket truss 426A and/or 426B.

The apex 412A-B of the apex axle truss 410 strengthens the apex axle truss 410. In some embodiments, suspension bracketry is secured to the flat upper wall 450 of the apex axle truss 410 e.g., providing greater strength than suspension bracketry in conventional systems). The triangular walls 452A-B provides greater strength (e.g., distributes load) between the apex axle truss 410 and the apex coil spring bracket trusses 426A-B to prevent weak portions in the end-to-end apex axle truss system 402.

The apex coil spring bracket truss 426 being secured (e.g., welded) to the axle housing 422 via angled walls 462A-B and openings 466 of the flat upper wall 460 strengthens the apex coil spring bracket truss 426 (e.g., distributing the load between three points of attaching, distributing the load via the angled walls 462A-B).

In some embodiments, the bottom portion of one or more of the vertical walls 440 of the apex axle truss 410 have angled walls 444 (e.g., that are substantially similar to the vertical walls 464 of the apex coil spring bracket truss 426). In some embodiments, the apex axle truss 410 is secured (e.g., welded) to the axle housing 422 via angled walls 444A-D. Being secured to the axle housing 422 via angled walls 444A-D strengthens the apex axle truss 410 (e.g., distributing the load via the angled walls 444A-D).

In some embodiments, one or more of the triangular wall 452A-B, vertical walls 440A-D, and/or angled wall 444A-D of the apex axle truss 410 is secured (e.g., welded) to one or more of the flat upper wall 460, vertical walls 464A-B, and/or angled walls 462A-B of the apex coil spring bracket trusses 426A-B.

In some embodiments, each of the angled walls 462 are at about a 45-degree angle from the plane of the corresponding vertical wall 464. In some embodiments, each of the angled walls 444 are at about a 45-degree angle from the plane of the corresponding vertical wall 440.

FIGS. 4B-C illustrate views of the apex coil spring bracket truss 426, according to certain embodiments. FIG. 4B illustrates a front perspective view of the apex coil spring bracket truss 426 and FIG. 4C illustrates a side view of the apex coil spring bracket truss 426. The openings 466, cut-outs, and/or slots can be used to one or more of secure a cylindrical structure 468 to the flat upper wall 460, secure (e.g., via welding) the flat upper wall 460 to the upper surface of the axle housing 422, secure to (e.g., weld to, interlock with, fasten to) one or more components (e.g., bracketry, skids, apex axle truss 410, etc.), and/or the like. In some embodiments, the flat upper wall 460 has one or more protrusions to secure to (e.g., weld to, interlock with, fasten to) one or more components (e.g., bracketry, skids, apex axle truss 410, etc.).

The apex coil spring bracket trusses 426 (e.g., apex coil buckets) are configured to secure (e.g., weld) to the axle housing 422 by adding two peaks (e.g., via the angled walls 462A-B) at opposing 45 degrees instead of directly above. The apex coil spring bracket trusses 426 also connect to different brackets in different orientations (e.g., all needed brackets in needed orientations). The coil spring sits directly on top of the apex coil spring bracket truss 426. The apex coil spring bracket truss 426 can rotate independently of apex axle truss system 402 for fine tuning of the suspension geometry. In some examples, the apex coil spring bracket truss 426 is rotated around the axle housing 422 to a desired orientation before securing (e.g., welding) to the axle housing 422.

Figure 4E:
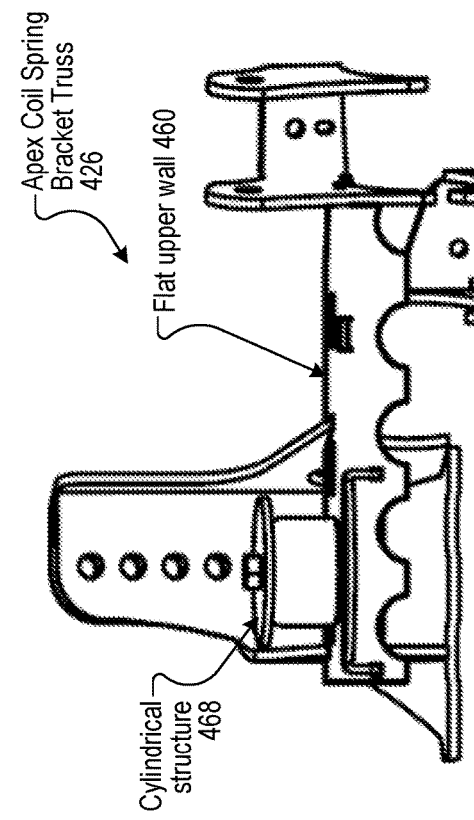
Figure 4G:
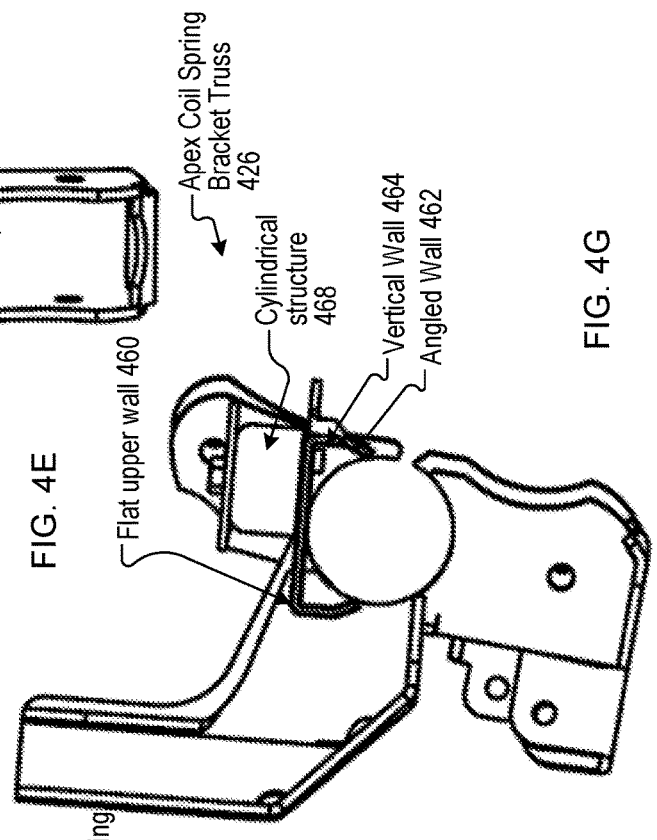
Figure 4D:
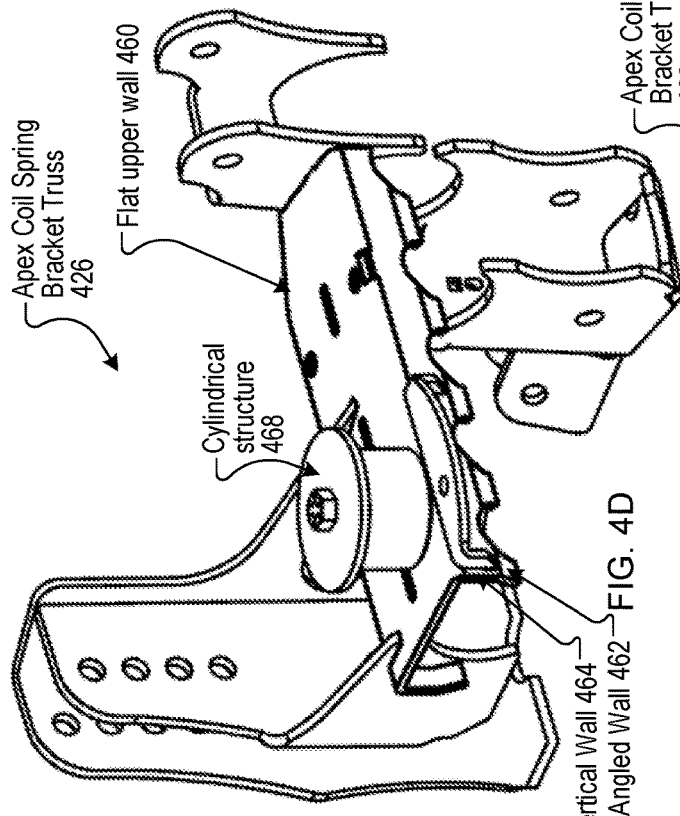
Figure 4F:
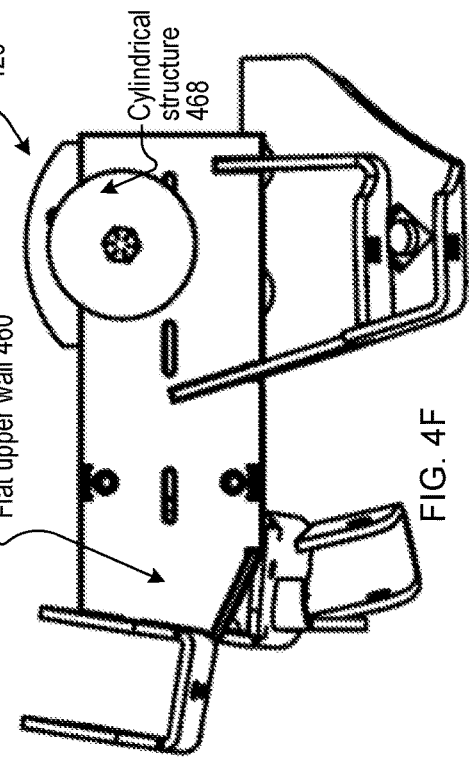

FIGS. 4D-G illustrates views of the apex coil spring bracket truss 426, according to certain embodiments. FIG. 4D illustrates a front perspective view, FIG. 4E illustrates a front view, FIG. 4F illustrates a top view, and FIG. 4G illustrates a side view of the apex coil spring bracket truss 426, according to certain embodiments.

Figure 4J:
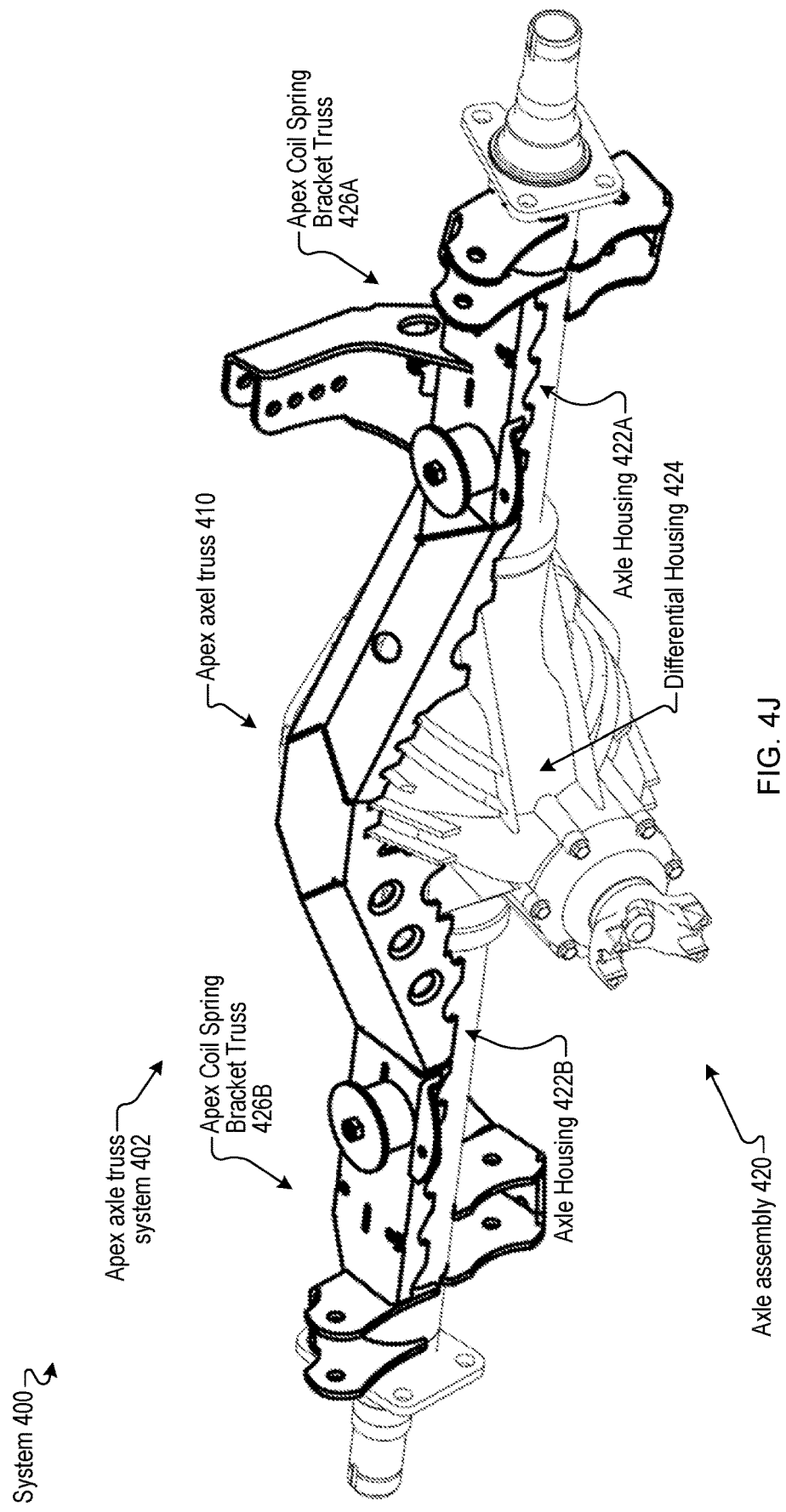

FIG. 4H illustrates an exploded front view of a system 400 including an apex axle truss system 402 and an axle assembly 420, according to certain embodiments. FIG. 4I illustrates an assembled front view of a system 400 including an apex axle truss system 402 and an axle assembly 420, according to certain embodiments. FIG. 4J illustrates an assembled rear perspective view of a system 400 including an apex axle truss system 402 and an axle assembly 420, according to certain embodiments.

FIGS. 5A-J illustrate an apex axle truss system 502 of a system 500, according to certain embodiments. Features with similar reference numbers as those in one or more of FIGS. 1A-4J may have the same or similar structure or function as those described in conjunction with one or more of FIGS. 1A-4J.

Figure 5A:
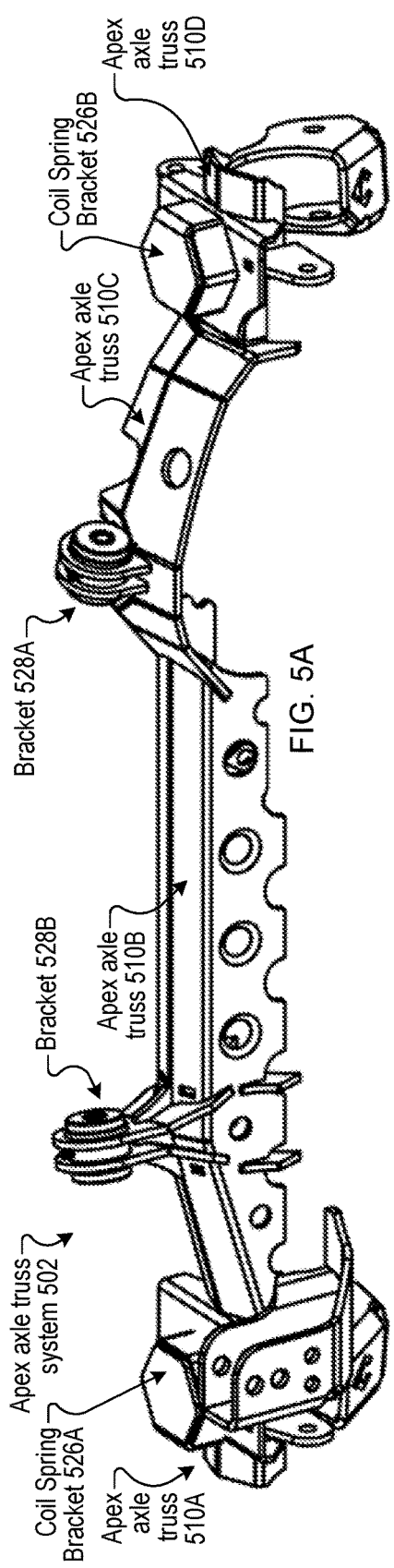
Figure 5B:
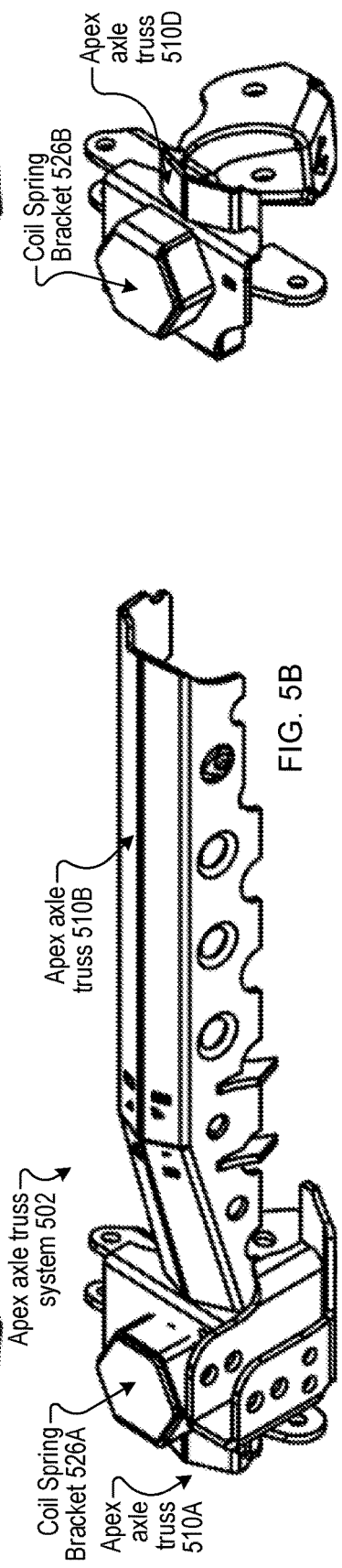
Figure 5C:
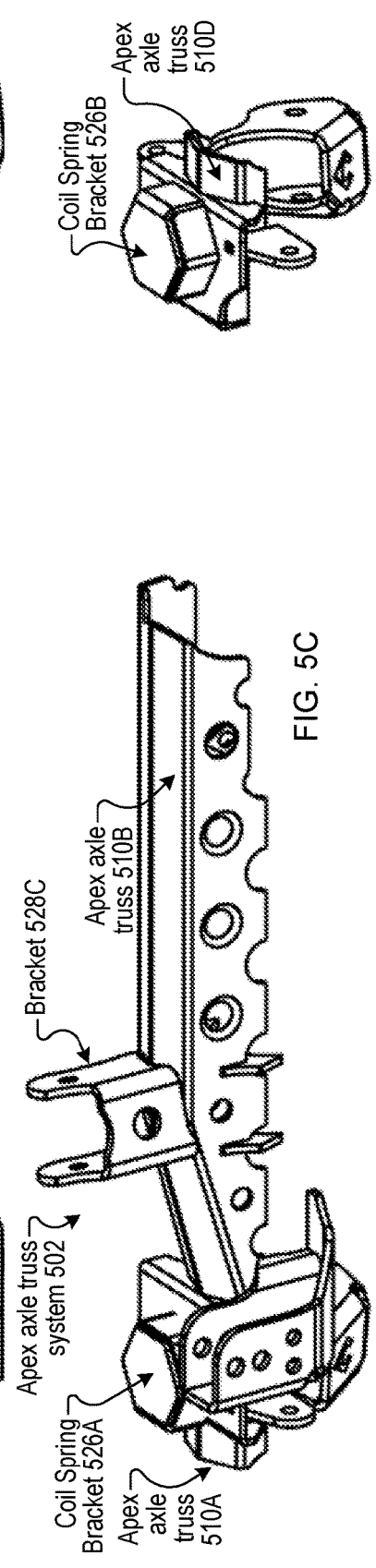

FIGS. 5A-C illustrate a front perspective view of an apex axle truss system 502, according to certain embodiments.

The apex axle truss system 502 includes apex axle trusses 510A-E (e.g., one or more of apex axle truss 110 of FIG. 1, apex axle truss 210 of FIGS. 2A-G, apex axle truss 310 of FIGS. 3A-D, apex axle truss 410 of FIGS. 4A and 4H-J). The apex axle truss system 502 further includes coil spring brackets 526A-B and one or more brackets 528.

In some embodiments, apex axle truss 510A is configured to be disposed on the axle housing 522A under coil spring bracket 526A and apex axle truss 510E is configured to be disposed on the axle housing 522B under coil spring bracket 526B. In some embodiments, apex axle trusses 510A and 510E have a lower profile than the apex axle truss 510B. In some embodiments, the apex axle truss 510B has substantially the same height of apex axle truss 510A (e.g., at a first distal end of apex axle truss 510B proximate the apex axle truss 510), slopes to a taller height, and substantially maintains the taller height (e.g., until the second distal end proximate the apex axle truss 510C. The apex axle trusses 510A-B are disposed over the axle housing 522A, the apex axle truss 510C is disposed over the differential housing 524, and the apex axle truss 510D is disposed over the axle housing 522B.

In some embodiments, the apex axle truss 510C is referred to as an apex differential truss. The apex axle truss 510C includes one or more angled walls 514A and one or more second angled walls 514B, where the angled walls 514A-B form one or more apex 512. In some embodiments, the apex axle truss 510C includes a sheet of metal that has been bent to form the angled walls 514A and the angled walls 514B. One or more of the angled walls 514A have a corresponding distal end configured to be secured (e.g., welded) to a corresponding portion of the differential housing 524 and one or more of the angled walls 514B have a corresponding distal end configured to be secured (e.g., welded) to a corresponding portion of the differential housing 524.

In some embodiments, the apex axle trusses 510 are configured to be secured to (e.g., welded to, fastened to, interlocked with) each other.

In some embodiments, the apex axle truss system 502 includes a bracket 528 (e.g., suspension bracketry) secured (e.g., integral, welded, fastened, etc.) to an upper surface of one or more of the apex axle trusses 510. In some embodiments, the apex axle truss 510C secures a bracket 528A proximate to the surface of the differential housing 524. In some embodiments, the brackets 528 are at substantially the same height. In some embodiments, one or more of the brackets 528 are used to connect to one or more control arms to prevent axle housing movement (e.g., prevent frontward movement, rearward movement, rotation, etc.).

The apex axle truss 510D extends under the coil spring bracket 526B to strengthen the junction between the axle housing 522B and the differential housing 524 (e.g., differential casting).

Figure 5D:
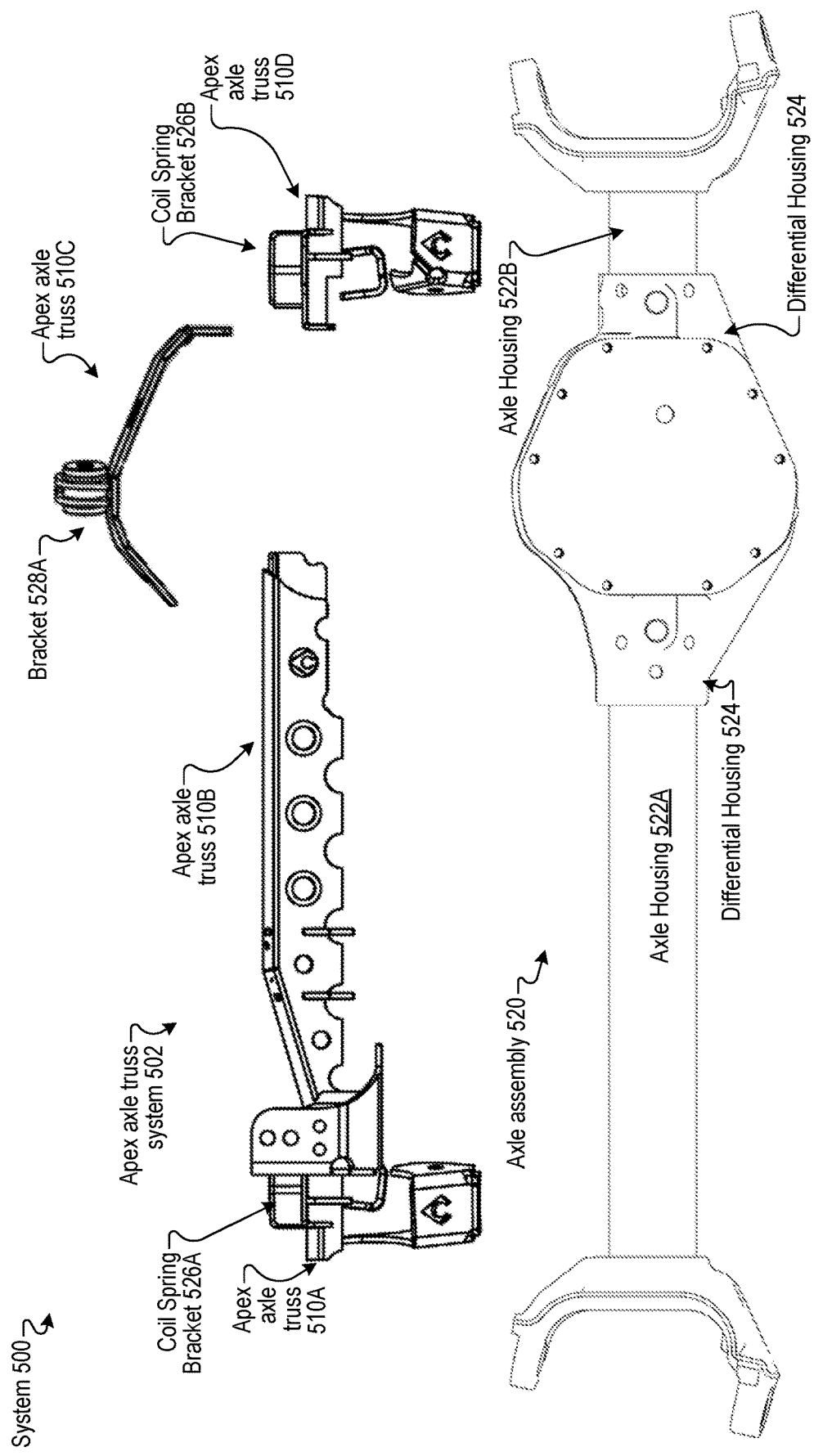

FIG. 5D-F illustrate views of a system 500 including an apex axle truss system 502 and an axle assembly 520, according to certain embodiments. FIG. 5D illustrates an exploded front view, FIG. 5E illustrates an assembled front view, and FIG. 5F illustrates an assembled perspective view of a system 500 including an apex axle truss system 502 and an axle assembly 520, according to certain embodiments.

Figure 5H:
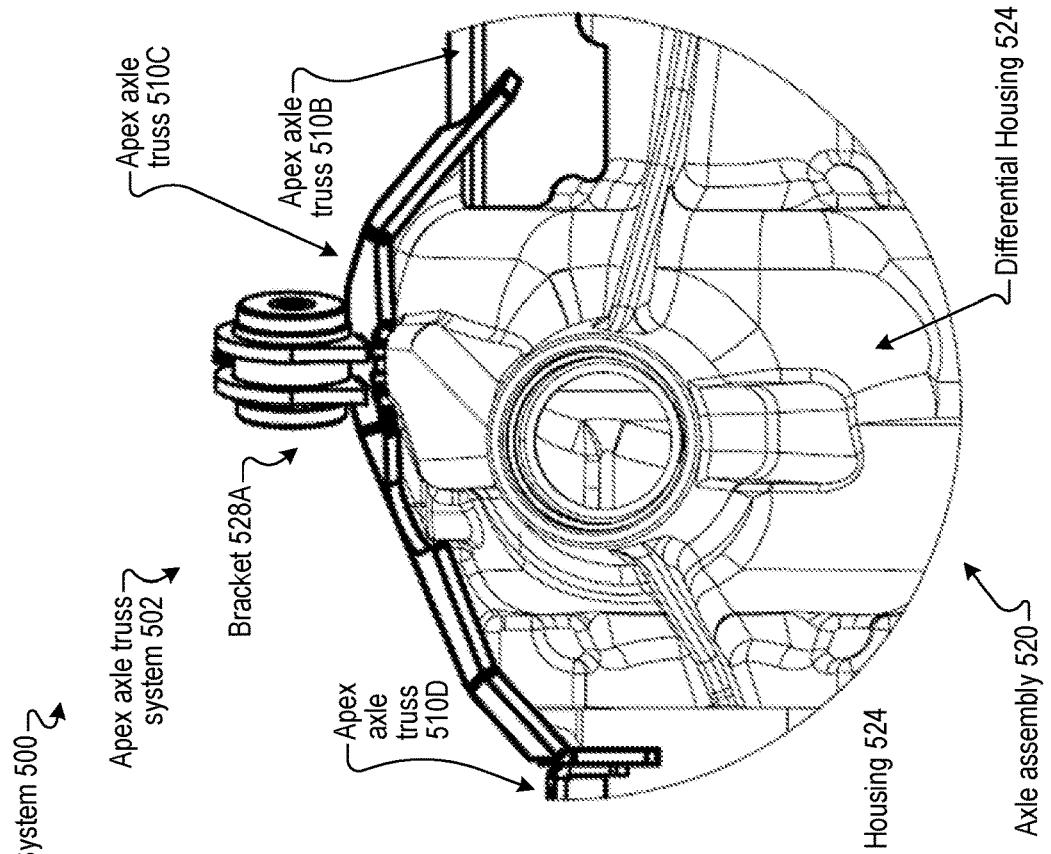
Figure 5G:
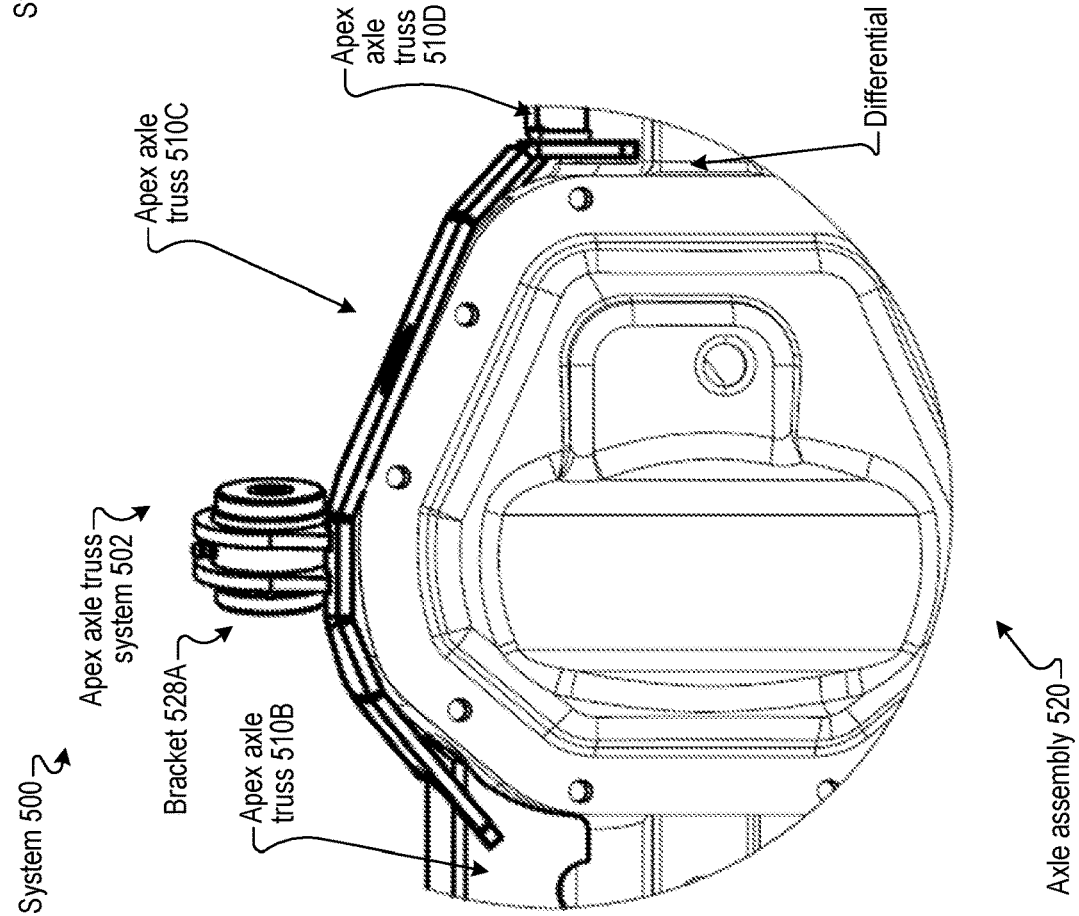

FIG. 5G-J illustrate views of a system 500 including an apex axle truss system 502 and an axle assembly 520, according to certain embodiments. FIG. 5G illustrates a front view, FIG. 5H illustrates a rear view, FIG. 5I illustrates a perspective rear view, and FIG. 5J illustrates a top view of a system 500 including an apex axle truss system 502 and an axle assembly 520, according to certain embodiments.

The apex axle truss 510C (e.g., apex differential top cap) conforms to the shape of the differential housings 524 (e.g., OEM differential castings) using a series of bends. This allows the apex axle truss 510C to sit directly on the differential housing 524 tightly to be secured (e.g., welded)

directly to the differential housing 524. Since the apex axle truss 510C is so tight to the differential housing 524, this allows the bracket 528A (e.g., UCA bracket) to be mounted as low as physically possible which maintains close to factory suspension geometry which improves ride quality and off-road performance. Welding the bracket 528A to the apex axle truss 510C instead of the differential housing 524 (e.g., casting) is far stronger because the bracket 528A and the apex axle truss 510C are similar or the same type of materials and spreads the load to the apex axle truss 510C instead of the localized weld on the differential housing 524. Securing the bracket 528A to the apex axle truss 510C ties the bracket 528A to the other components of the apex axle truss system 502 (e.g., other apex axle trusses 510, coil spring bracket 526, etc.) and ties both sides of the differential housing 524 together for extra strength.

Any of the features, embodiments, functionalities of FIGS. 1A-5J may be used in conjunction with each other. Similar features in different embodiments may have the same or similar structure, advantages, and/or functionalities as similar features in other embodiments.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

Various operations are described as multiple discrete operations, in turn, in a manner that is most helpful in understanding the present disclosure, however, the order of description should not be construed to imply that these operations are necessarily order dependent. In particular, these operations need not be performed in the order of presentation.

The terms "over," "under," "between," "disposed on," and "on" as used herein refer to a relative position of one material layer or component with respect to other layers or components. For example, one layer disposed on, over, or under another layer may be directly in contact with the other layer or may have one or more intervening layers. Moreover, one layer disposed between two layers may be directly in contact with the two layers or may have one or more intervening layers. Similarly, unless explicitly stated otherwise, one feature disposed between two features may be in direct contact with the adjacent features or may have one or more intervening layers.

Various embodiments can have different combinations of the structural features described above. For instance, all optional features of apex axle truss systems described above can also be implemented in an apex axle truss system and specifics in the examples can be used anywhere in one or more embodiments.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of material, specific sizes, specific surfaces, specific structures, specific details, specific configurations, specific types, specific system components, specific operations, etc. in order to provide a thorough understanding of the present disclosure. It will be apparent, however, to one skilled in the art that these specific details need not be employed to practice the present disclosure. In other instances, well known components or methods, such as specific and alternative material, sizes, surfaces, structures, details, configurations, types, system components, operations, etc. have not been described in detail in order to avoid unnecessarily obscuring the present disclosure.

Although some of the embodiments herein are described with reference to an axle assembly of a vehicle, other embodiments are applicable to other types of structures and surfaces. Similar techniques and teachings of embodiments of the present disclosure can be applied to other types of structures and surfaces that can benefit from strengthening a system. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

As used herein, the terms "substantially," "about," and/or the like, in some embodiments refer to a range of 2% greater and 2% less, in some embodiments refer to a range of 5% greater and 5% less, in some embodiments refer to a range of 10% greater and 10% less, in some embodiments refer to a range of 15% greater and 15% less, and in some embodiments refer to a range of 20% greater and 20% less, Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task.

Furthermore, use of the phrases 'to,' 'capable of/to,' and or 'operable to,' in one embodiment, refers to some apparatus, hardware, and/or element designed in such a way to enable use of the apparatus, hardware, and/or element in a specified manner. Note that use of to, capable to, or operable to, in one embodiment, refers to the latent state of an apparatus, hardware, and/or element, where the apparatus, hardware, and/or element is not operating but is designed in such a manner to enable use of an apparatus in a specified manner.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics can be combined in any suitable manner in one or more embodiments.

In the foregoing specification, a detailed description has been given with reference to specific exemplary embodiments. It will, however, be evident that various modifications and changes can be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but can refer to different and distinct embodiments, as well as potentially the same embodiment.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and can not necessarily have an ordinal meaning according to their numerical designation.

What is claimed is:

1. An apex axle truss system comprising:
a first apex axle truss comprising a sheet of metal that has been bent to form:
   a first substantially vertical wall configured to be secured to a first lateral side of an axle housing;
   a second substantially vertical wall configured to be secured to a second lateral side of the axle housing;
   a first angled wall disposed between the first substantially vertical wall and the second substantially vertical wall; and
   a second angled wall disposed between the first angled wall and the second substantially vertical wall, wherein the first angled wall and the second angled wall contact each other to form a pointed apex, wherein the pointed apex is configured to be disposed over an upper surface of the axle housing, wherein the first apex axle truss is configured to be disposed above the axle housing without extending under the axle housing.

2. The apex axle truss system of claim 1, wherein the first apex axle truss is sized and shaped to be disposed under a coil spring bracket.

3. The apex axle truss system of claim 1, wherein the first apex axle truss is sized and shaped to be disposed adjacent to a coil spring bracket.

4. The apex axle truss system of claim 1, wherein the first apex axle truss is sized and shaped to be disposed over at least a portion of a differential housing, wherein the differential housing is secured to the axle housing.

5. The apex axle truss system of claim 1, wherein the apex axle truss system runs from a first inner C to a second inner C.

6. The apex axle truss system of claim 1, wherein a first distal end of the first substantially vertical wall is configured to be secured to the first lateral side of the axle housing via one or more first welds, and wherein a second distal end of the second substantially vertical wall is configured to be secured to the second lateral side of the axle housing via one or more second welds.

7. The apex axle truss system of claim 1, wherein the first apex axle truss is configured to interlock with a second apex axle truss.

8. An apex axle truss system comprising:
an apex differential truss comprising a sheet of metal that has been bent to form:
   a first angled wall comprising a first distal end configured to be secured to a first side of a differential housing; and
   a second angled wall comprising a second distal end configured to be secured to a second side of the differential housing that is opposite the first side of the differential housing, wherein the first side and the second side are disposed around a longitudinal axis of the differential housing, wherein the first angled wall and the second angled wall form a first apex; and
suspension bracketry secured to an upper surface of the apex differential truss, wherein the suspension bracketry is configured to connect to one or more control arms to prevent axle housing movement.

9. The apex axle truss system of claim 8 further comprising:
a first apex axle truss comprising a second apex, wherein the first apex axle truss is configured to be disposed over a first axle housing; and
a second apex axle truss comprising a third apex, wherein the second apex axle truss is configured to be disposed over a second axle housing, wherein the differential housing is disposed between the first axle housing and the second axle housing.

10. The apex axle truss system of claim 9, wherein the apex differential truss is configured to interlock with the first apex axle truss and the second apex axle truss.

11. The apex axle truss system of claim 9, wherein responsive to the apex differential truss and the first apex axle truss being secured together, the first apex axle truss and the apex differential truss form a slot to receive a portion of a coil spring bracket.

12. The apex axle truss system of claim 9, wherein the first apex axle truss comprises:
a first substantially vertical wall configured to be secured to a first lateral side of the first axle housing; and
a second substantially vertical wall configured to be secured to a second lateral side of the first axle housing.

13. The apex axle truss system of claim 8, wherein the one or more control arms connect to brackets on a vehicle frame, wherein the axle housing movement comprises frontward movement, rearward movement, and rotation.

14. An apex axle truss system comprising:
an apex coil spring bracket truss comprising a sheet of metal that has been bent to form:
   a flat upper wall configured to be disposed over an axle housing;
   a first angled wall configured to be secured to a first lateral side of the axle housing;
   a first substantially vertical wall disposed between the first angled wall and the flat upper wall;
   a second angled wall configured to be secured to a second lateral side of the axle housing; and
   a second substantially vertical wall disposed between the second angled wall and the flat upper wall; and
an apex axle truss comprising a third angled wall and a fourth angled wall that contact each other to form a pointed apex, wherein the apex axle truss is configured to be disposed adjacent to the apex coil spring bracket truss.

15. The apex axle truss system of claim 14, wherein the first angled wall is angled towards the first lateral side of the axle housing, and wherein the second angled wall is angled towards the second lateral side of the axle housing.

16. The apex axle truss system of claim 14, wherein the flat upper wall forms one or more openings, wherein the flat upper wall is to be secured to the axle housing via the one or more openings.

17. The apex axle truss system of claim 16, wherein the first angled wall is configured to be secured to the first lateral side of the axle housing via one or more first welds, wherein the second angled wall is configured to be secured to the second lateral side of the axle housing via one or more second welds, and wherein the flat upper wall is configured to be secured to an upper surface of the axle housing via one or more third welds through the one or more openings.

18. The apex axle truss system of claim 14, wherein a cylindrical structure is disposed on an upper surface of the flat upper wall, wherein the cylindrical structure is configured to locate a coil spring on the apex coil spring bracket truss.

19. The apex axle truss system of claim 14, wherein the apex axle truss further comprises a triangular wall comprising a three-sided perimeter, wherein a first side of the three-sided perimeter borders the second angled wall, wherein a second side of the three-sided perimeter borders the third angled wall, and wherein a third side of the three-sided perimeter is configured to be secured to the flat upper wall of the apex coil spring bracket truss.

\* \* \* \* \*